(12) United States Patent
Nojima

(10) Patent No.: US 7,110,272 B2
(45) Date of Patent: Sep. 19, 2006

(54) INVERTER BRIDGE CONTROLLER IMPLEMENTING SHORT-CIRCUIT PROTECTION SCHEME

(75) Inventor: Geraldo Nojima, Duluth, GA (US)

(73) Assignee: SMC Electrical Products, Inc., Huntington, WV (US)

( * ) Notice: Subject to any disclaimer, the term of this patent is extended or adjusted under 35 U.S.C. 154(b) by 281 days.

(21) Appl. No.: 10/872,538

(22) Filed: Jun. 22, 2004

(65) Prior Publication Data

US 2005/0281065 A1    Dec. 22, 2005

(51) Int. Cl.
H02H 7/122    (2006.01)
(52) U.S. Cl. .................. 363/56.03; 363/56.04
(58) Field of Classification Search ........... 363/56.02, 363/56.03, 56.04
See application file for complete search history.

(56) References Cited

U.S. PATENT DOCUMENTS

| | | | | |
|---|---|---|---|---|
| 4,439,806 A * | 3/1984 | Brajder | .................... | 361/98 |
| 4,520,437 A * | 5/1985 | Boettcher et al. | ............. | 363/41 |
| 5,115,388 A * | 5/1992 | Shigekane | ............... | 363/56.03 |
| 6,233,164 B1 * | 5/2001 | Zee et al. | ................. | 363/56.03 |
| 6,404,655 B1 | 6/2002 | Welches | | |
| 6,687,136 B1 * | 2/2004 | Morimoto et al. | ............ | 363/17 |
| 7,031,172 B1 * | 4/2006 | Tanaka et al. | ........... | 363/56.03 |

OTHER PUBLICATIONS

International Rectifier, Application Note AN-983 (v.Int), "IGBT Characteristics," original Mar. 10, 1997, modified May 10, 2004, 233 Kansas St., El Segundo California 90245.

Eupec GmbH, Application Note AN2003-03, "Switching behavior and optimal driving of IGBT$^3$ modules" by Rusche et al. dated Apr. 8, 2003, Max-Planck-Strasse 5 D-59581 Warstein, An Infineon Technologies Company.

Eupec GmbH, Application Note AN2005-05, "Short Circuit Operation of 6.5kV IGBTs" by Schütze, dated Jul. 5, 2002, Max-Planck-Strasse 5 D-59581 Warstein, An Infineon Technologies Company.

Fuji IGBT Modules Application Manual, Fuji Electric Device Technology Co., Ltd., Feb. 2004, REH984.

<http://www.powerdesigners.com/InfoWeb/design_center/articles/IGBTs/igbts.shtm>, "IGBTs Basics," Copyright © G. Ledwich 1998, PowerDesigners, LLC 1998.

<http://www.semikron.com/skcweb/e/applica/applica_help.html>, Semikron Application notes, index and pp. 199-218 ("Fault behaviour and protection"), Copyright © 2003 Semikron International Germany, Jul. 15, 2002.

* cited by examiner

Primary Examiner—Jeffrey Sterrett
(74) Attorney, Agent, or Firm—Sughrue Mion, PLLC

(57) ABSTRACT

A fault handling system for short circuit recovery in three-phase multiple-level inverter bridges, used to drive inductive loads, which waits for either desaturation of switches or expiration of a delay period based upon an amount of time before saturated switches are damaged before commanding off switches that are saturated, and which artificially creates a dead-short across the three-phase output to force switches conducting a fault current to desaturate. By delaying the switching-off of the inverter bridge during a fault, waiting for desaturation to occur, the statistical likelihood of switch survival is improved.

25 Claims, 22 Drawing Sheets

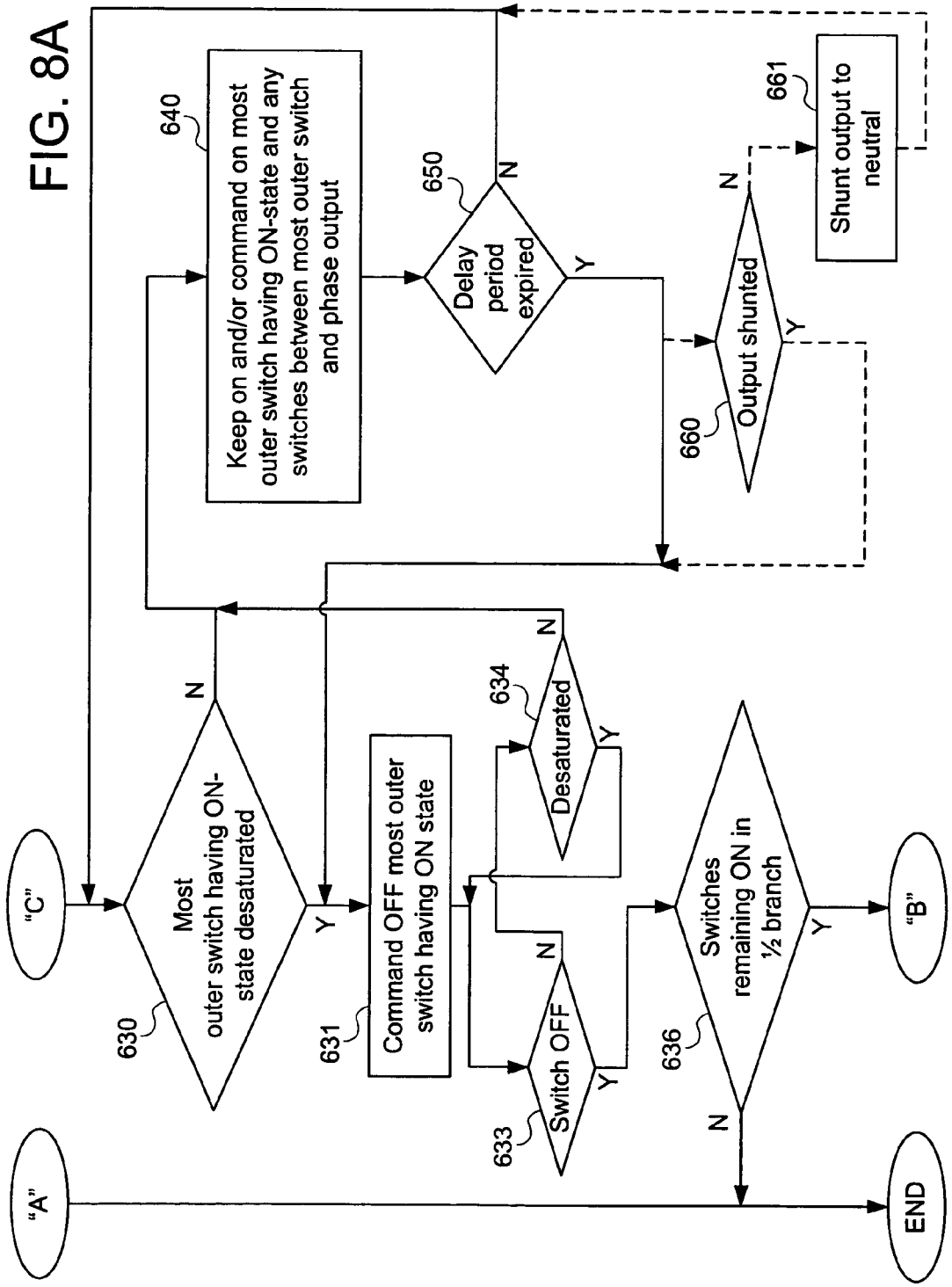

INVERTER BRIDGE CONTROLLER IMPLEMENTING SHORT-CIRCUIT PROTECTION SCHEME

BACKGROUND OF THE INVENTION

1. Field of the Invention

Fault handling in inverter bridges utilizing Insulated Gate Bipolar Transistors (IGBTs) and similar switching devices, such as inverter bridges utilized with three-phase AC motors.

2. Description of the Related Art

Inverter bridges provide controlled energy used to drive inductive loads. A plurality of switches within the inverter bridge are sequentially switched to vary the inverter bridge's output voltage. Typically, output is a three-phase alternating current voltage. For a general background description of inverter bridge topologies, sequential switching schemes, and circuits and procedures for performing sequential switching schemes, PCT Publications WO 02/37654 A2 published 10 May 2002 and WO 2004/015851 A2 published 19 Feb. 2004 are incorporated herein by reference. An exemplary three-level inverter bridge topology is illustrated in FIG. 1.

In conventional inverter bridges, fault conditions (short-circuits) can be characterized as falling into one of two categories. A first category is a Type I fault. Typically, a Type I fault is the result of a fault inside the drive (for example, an IGBT failure or an output fault with low inductance). As a result of the low impedance, the increase in current (di/dt) through the IGBT is high, such that the IGBT is forced to desaturate.

When a Type I fault is detected, the switches of the inverter bridge are sequentially commanded to an off-state. Because the switches are not saturated, the current decays slowly, causing no appreciable voltage spikes. Therefore, Type I faults for two-level inverter bridges are fairly easy to manage, and numerous methods are known in the art.

A second category is a Type II fault, which is typically a fault external to an inverter bridge, such as a cable short-circuit or motor fault. The impedance in the circuit undergoing fault is typically high, resulting in the current through the IGBT rising slowly. The result is that the IGBT saturates under the Type II fault condition; or a Type II fault may occur while a particular IGBT is already in saturation.

Under a Type II fault condition, the IGBT can be quickly turned off when the IGBT is commanded to an off-state while in saturation. However, such switching while in saturation results in a voltage spike that may destroy the transistor. The voltage spike is due to a counter-electromotive force produced by the negative current di/dt times a leakage inductance of the circuit. Under a Type II fault, the currents rise to levels several times higher than the rated nominal current of the IGBT.

A Type II short-circuit fault is the worst case for an inverter bridge, particularly in a multiple-level (three-or-more level) inverter bridge, because it allows the IGBT to saturate during a fault condition. Type II faults involve a short-circuit path inductance which causes a limited di/dt current increase, which will allow the current to rise well above the maximum rated current of the IGBT, but will not allow the IGBT to enter desaturation.

Existing solutions to this problem generally create other problems. For example, adding additional circuitry to an inverter bridge to cut off power to the inductive load, without commanding off the IGBTs, as a practical matter, increases the leakage inductance of the inverter bridge circuit, thereby causing otherwise innocuous current switching di/dts to generate harmful voltage spikes. In comparison, if the switches are commanded off during a Type II fault and the fault current rises above the maximum rated current of the IGBT, then the IGBT will most likely be destroyed by the voltage spike generated by the negative current di/dt.

As shown in FIG. 2, at the initiation ($t_1$) of a Type II fault, current rises slowly. However, the time between an inverter controller recognizing an overload situation ($t_2$) and when the short circuit current exceeds a maximum rated current ($t_3$) is often less time than an individual IGBT requires to switch off. Because of inherent time delays which increase with the power-handling capacity of the switch used, the fault current continues to rise, entering a forbidden region for switch shut-off before the controller can act, or before a switch commanded to shut-off actually does shut-off.

One way to slow the rise time down further is artificially increase inductance at the output of the inverter bridge. However, this increases losses and does not address the situation when the inductance itself is the cause of the short-circuit.

Once the fault current enters the forbidden region for switch shut-off, safe shut off is only possible if the current thereafter decreases below the maximum rated current ($I_{max}$) of the IGBT, or when the current exceeds the required current to desaturate the IGBT. However, once an IGBT reaches desaturation current levels under a fault condition ($t_4$), there is very little time to turn off the switch before there is thermal damage to the IGBT.

To date, in conventional designs, there is always a fault current inductance that will cause any inverter bridge to risk destruction when commanding the IGBTs to an off-state during a Type II fault. Moreover, with conventional inverter bridges, even when the inverter bridge controller commands switches off in a proper sequence, since desaturation ordinarily occurs randomly among the switches in series, destruction of the switches may nonetheless occur.

SUMMARY OF THE INVENTION

The invention is a new control scheme for the protection of Insulated Gate Bipolar Transistors (IGBTs) in an inverter bridge in the case of short-circuit, including type II faults. Transistors experiencing a Type II fault turn off quickly. The principles of the invention hold true for any AC drive—low, medium or high voltage—from any manufacturer. Additionally, the principles hold true when the inverter bridge switches are other types of transistors which experience desaturation under fault conditions, such as bipolar junction transistors (BJTs) and field effect transistors (FETs).

A three-phase inverter bridge has three branches and "L" bus voltage levels ($L \geq 2$). Each branch provides one phase of the three-phase output for driving an inductive load. An exemplary three-level inverter bridge is illustrated in FIG. 1, and single branches of two-level, four-level, and five-level inverter bridges are illustrated in FIGS. 3, 4, and 5.

One of the L levels is a most-negative bus voltage and one of the L levels is a most-positive bus voltage. Any intermediate bus voltage levels are differentiated from other bus voltage levels by:

$$\frac{V_{MostPositive} - V_{MostNegative}}{(L-1)}$$

Each branch of an inverter bridge comprises two half-branches: a first one-half branch comprising switches connected between the most-positive bus voltage and a respective phase output, and a second one-half branch comprising switches connected between the most-negative bus voltage and the respective phase output.

In a half-branch of an inverter bridge having three-or-more levels, the direction toward the most-positive rail or most-negative rail is referred to as "outer," whereas the direction toward the phase output is referred to as "inner." For example, referring to FIG. 5, switches $S_1$ and $S_8$ are the outermost switches, whereas switches $S_4$ and $S_5$ are the innermost switches.

When shutting off switches, whether under normal operating conditions or fault conditions, it is essential to shut off switches in each half branch sequentially from outer to inner, as is known in the art. The present invention facilitates safe shutting off of outer switches by increasing the probability that the outer switches desaturate and shut-off first.

A first aspect of the invention is a method of controlling an inverter bridge, which for each branch comprises comparing an instantaneous output current ($I_o$) of a phase of the three-phase output of the inverter bridge with a rated nominal current of a switch ($I_{Nom}$) of the switches of the branch plus an overload current threshold ($I_{OL}$). The overload current threshold $I_{OL}$ is selected so that $I_{OL}+I_{Nom}$ satisfies $I_{max}>I_{OL}+I_{Nom}\geq I_{Nom}$, $I_{max}$ being a maximum rated current of the switches of the branch. If $|I_o|>I_{Nom}+I_{OL}$, then the switches that are conducting the instantaneous output current ($I_o$) exceeding $I_{Nom}+I_{OL}$ are identified, and an off-state is secured for switches that are identified as not conducting $I_o$ and being in an off-state. If switches of the branch have an on-state in a half-branch that is not conducting the instantaneous output current ($I_o$) exceeding $I_{Nom}+I_{OL}$, the switches in that half-branch are sequentially turned off in a conventional manner.

The instantaneous current ($I_o$) is also compared with $I_{max}$. If $I_{Nom}+I_{OL}<|I_o|\leq I_{max}$, all switches of a half-branch conducting $I_o$ remaining in an on-state are sequentially commanded to assume an off-state, while continuing to compare for $I_o>I_{max}$. Until a time elapsed after the last switch is commanded to an off-state exceeds a wait time ($t_{off}$), the comparison for $|I_o|>I_{max}$ continues. The wait time ($t_{off}$) is defined as a rated turn-off time of the switches, which is a sum of a turn-off delay time plus current fall-time.

If $|I_o|>I_{max}$, a most outer switch remaining in an on-state is checked for desaturation. A way to check for desaturation, if the switches are insulated gate bipolar transistors (IGBTs) or bipolar junction transistors (BJTs) is by determining whether a collector-to-emitter voltage ($V_{ce}$) of the switch and is above a rated saturation collector-to-emitter voltage ($V_{cesat}$) of the switch, wherein the switch is not desaturated if $V_{ce}\leq V_{ce\ sat}$ and is desaturated if $V_{ce}>V_{ce\ sat}$.

If the switch is not desaturated, the most outer switch remaining in an on-state is kept an on-state, and any switches between the most outer switch and the phase output are kept in an on-state. If the most outer switch and any switches between the most outer switch remaining in an on-state and the phase output have been commanded to an off-state, then those switches are commanded back to an on-state. Then a waiting period begins, delaying until a sooner of desaturation and expiration of a delay period based upon an amount of time before the switches remaining in an on-state are damaged. The delay period can be either be pre-set or feedback-based, and preferably corresponds to a time for a temperature of the most outer switch remaining in an on-state to reach a maximum rated temperature value.

If the most outer transistor switch is desaturated or when the delay period expires, the most outer switch remaining in an on-state is turned off, and then if any switches remain in an on-state, the process is repeated from comparing the instantaneous output current ($I_o$) exceeding $I_{Nom}+I_{OL}$ with $I_{max}$.

If a feedback-based delay period is utilized, and the switches are insulated gate bipolar transistors (IGBTs) or bipolar junction transistors (BJTs), determining the time for the temperature of the most outer transistor switch remaining in an on-state to reach the maximum rated temperature value based on the instantaneous current $I_o$ according to:

$$\int (V_{ce\cdot sat} \times |I_o|) dt > \frac{V_{ce\cdot max} \times I_{sc}}{L-1}$$

where $V_{ce\ max}$ is defined as a maximum rated collector-to-emitter voltage of the most outer transistor switch remaining in an on-state, and $I_{sc}$ is defined as a maximum rated short circuit current per transistor switch.

If a pre-set delay time is utilized, the switches are insulated gate bipolar transistors (IGBTs) or bipolar junction transistors (BJTs), determining the time for the temperature of the most outer transistor switch remaining in an on-state to reach the maximum rated temperature value can be determined to approximately equal:

$$\frac{t_{sc\cdot max} \times V_{ce\cdot sat}}{V_{ce\cdot max}}$$

where $t_{sc\ max}$ is defined as a rated maximum short-circuit time duration which the transistor switch can withstand when submitted to $V_{ce\ max}$ and $I_{sc}$.

The rated nominal current of the transistor switch ($I_{Nom}$), the maximum rated current of the transistor switch ($I_{max}$), the rated saturation collector-to-emitter voltage ($V_{ce\ sat}$), the maximum rated temperature value, the maximum rated short circuit current per transistor switch ($I_{sc}$), and the rated maximum short-circuit time duration ($t_{sc\ max}$) which the transistor switch can withstand when submitted to $V_{ce\ max}$ and $I_{sc}$, can be ordinarily be determined from a manufacturer's specification for the transistor switch.

As a further variation on the first aspect of the invention, when the delay period expires without desaturation, prior to turning off the most outer transistor having an on-state, the phase output is shunted to a neutral voltage level (if not already shunted). The neutral voltage level is a difference of the most-positive bus voltage and the most-negative bus voltage, divided by two.

As an embodiment of this further variation, when the half branch conducting $I_o$ is a first one-half branch (switches between the most-positive bus voltage and the phase output), the shunting of the phase output to the neutral level shunts the first one-half branches of all three branches of the three-phase inverter bridge. When the half branch conducting $I_o$ is a second one-half branch (switches between the most-negative bus voltage and the phase output), the shunting the phase output to the neutral level shunts the second one-half branches of all three branches of the three-phase inverter bridge.

As another embodiment, the shunting of the phase output to the neutral level shunts all half branches of all three branches of the three-phase inverter bridge.

A second aspect of the invention is a three-phase inverter controller controlling a three-phase inverter bridge. For each branch, the controller comprises at least a first comparison circuit, a second comparison circuit, a delay circuit, and logic circuitry.

The first comparison circuit compares an instantaneous output current ($I_o$) of a phase of the three-phase output of the inverter bridge with a rated nominal current ($I_{Nom}$) of the switches of the branch plus an overload current threshold ($I_{OL}$). The overload current threshold $I_{OL}$ is selected so that $I_{OL}+I_{Nom}$ satisfies $I_{max} > I_{OL}+I_{Nom} \geq I_{Nom}$, wherein $I_{max}$ is a maximum rated current of the switches of the branch.

If $|I_o| > I_{Nom}+I_{OL}$, but if $|I_o| \leq I_{max}$, then the logic circuitry identifies switches of branch that are conducting the instantaneous output current ($I_o$) exceeding $I_{Nom}+I_{OL}$, secures an off-state to switches that are identified as not conducting $I_o$ and being in an off-state, and sequentially, from outer to inner, commands off switches within a half-branch containing switches that have an on-state but are not conducting the instantaneous output current ($I_o$) exceeding $I_{Nom}+I_{OL}$.

The second comparison circuit compares the instantaneous output current ($I_o$) with $I_{max}$. While $|I_o| > I_{Nom}+I_{OL}$ and $|I_o| \leq I_{max}$, the logic circuitry sequentially, from outer-to-inner, commands all switches remaining in an on-state to assume an off-state.

While $|I_o| > I_{max}$, the logic circuitry sequentially checks whether a most outer switch remaining in an on-state is desaturated. If not desaturated, then the logic circuitry keeps the most outer switch remaining in an on-state and any switches between the most outer switch and the phase output in an on-state, and if the most outer switch and any switches between the most outer switch remaining in an on-state and the phase output have been commanded to an off-state, then these transistor switches are commanded back to an on-state. The logic circuitry then waits until a sooner of desaturation and an expiration of a delay period of the delay circuit. The delay period is preferably set based upon an amount of time before the switches remaining in an on-state are damaged.

If most outer switch remaining in an on-state is (or becomes) desaturated or when said delay period expires, then the logic circuitry turns off the most outer switch remaining in an on-state, after which, a next most outer switch, if any, remaining in an on-state is checked for desaturation.

As an embodiment of the second aspect of the invention, the logic circuitry checks whether a most outer switch remaining in an on-state is desaturated by checking a signal received from a driver card driving the most outer transistor switch remaining in an on-state. This embodiment is convenient when utilizing driver cards that include the monitoring of saturation as a feature.

The delay period of the delay circuit is preferably set so that expiration of the delay period corresponds to a time for a temperature of the most outer transistor switch remaining in an on-state to reach a maximum rated temperature value.

As an embodiment of the second variation of the invention, the first comparison circuit comprises a first comparator, and the second comparison circuit comprises a second comparator.

A third aspect of the invention is a method of protecting switches of a three-phase inverter bridge when a short occurs and at least one of the transistor switches is allowed to saturate due to a short-circuit inductance. A short-circuit is detected by comparing output currents of each phase of the three-phase output of the inverter bridge with a threshold current level. In each branch providing one of the three-phase outputs in which a short-circuit is detected, a determination is made as to whether each switch of the branch having an on-state is saturated, and if it is determined that at least one transistor switch is saturated, the phase corresponding to the branch is shunted to a neutral voltage level. The neutral voltage level is a difference of the most-positive bus voltage and the most-negative bus voltage, divided by two.

As an embodiment of the third aspect of the invention, for each switch determined to be saturated, a determination is made as to which one-half branch contains the respective switch. When a saturated transistor switch is determined to be in one of the first one-half branches of the inverter bridge (switches connected between the most-positive bus voltage and a respective phase output), shunting comprises half-wave rectifying the phase output so as to pass that portion of the phase output having a more-positive bus voltage level than the neutral voltage level and connecting the half-wave rectified phase output to the neutral voltage level. When a saturated transistor switch is determined to be in one of the second one-half branches of the inverter bridge (switches connected between the most-negative bus voltage and the respective phase output), shunting comprises half-wave rectifying the phase output so as to pass that portion of the phase output having a more-negative voltage level than the neutral voltage level and connecting the half-wave rectified phase output to the neutral voltage level.

As another embodiment of the third aspect of the invention, the phase output is rectified and shunted so that the portions of the phase output above the neutral voltage level (positive) and below the neutral voltage level (negative) are shunted to the neutral voltage level.

A fourth aspect of the invention is a "crowbar" protection circuit for protecting switches of a three-phase inverter bridge when a short occurs and at least one of the switches is allowed to saturate due to a short-circuit inductance. The crowbar circuit comprises at least one switch, selectively shunting each phase of the three-phase output of the inverter bridge to a neutral voltage level. The neutral voltage level is a difference of the most-positive bus voltage and the most-negative bus voltage, divided by two. By closing the at least one switch, thereby shunting each phase to the neutral voltage, saturated switches of the three-phase inverter bridge become desaturated.

If the inverter bridge has an odd number of levels (L), the neutral voltage level corresponds to one of the "L" bus voltage levels of the inverter bridge. However, if "L" is an even number, the neutral voltage level is between two of the "L" bus voltage levels of the inverter bridge.

As an embodiment of the fourth aspect of the invention, the crowbar circuit is provided within a separate housing from the three-phase inverter bridge, configured to be electrically connected to the three-phase output of the inverter bridge.

As a further embodiment of the fourth aspect of the invention, the at least one switch of the crowbar circuit comprises a first switch and a second switch, The crowbar circuit further comprises a first set of three diodes, each diode of the first set having an anode connected to a respective phase output of the three-phase output of the inverter bridge, the cathodes of the first set of three diodes being connected to said first switch. By closing the first switch, the first switch selectively shunts a first half-wave rectified portion of the three-phase output to the neutral voltage level. The crowbar circuit also includes a second set of three diodes, each diode of the second set having a cathode connected to a respective phase output of the three-phase output of the inverter bridge, the anodes of the second set of three diodes being connected to said second switch. By closing the second switch, the second switch selectively shunts a second half-wave rectified portion of the three-phase output to the neutral voltage level.

The first and second switch can be configured to be closed collectively, shunting both half-wave rectified portions to the neutral voltage level, or the first and second switch can be configured to be closed individually.

A fifth aspect of the invention is a storage medium storing a set of program instructions for a controller, the controller being configured to control a three-phase inverter bridge. The set of program instruction, when executed by the controller, cause the controller to control the inverter bridge according to any of the above aspects of the invention.

These above aspects of the invention mitigate damage from Type I and Type II faults. When saturation occurs, by delaying until a sooner of desaturation of the most outer transistor remaining in an on-state and the expiration of the delay period, the statistical likelihood of switch survivability is markedly improved. While waiting until the brink of destruction to turn a switch off may still result in destruction caused by the −di/dt voltage spike if the switch is still saturated, statistical switch survivability is improved in comparison to when a switch conducting an overload current is allowed to cross into saturation after being commanded to an off-state, or is immediately commanded to an off-state while already in saturation. The closer the delay period is set to the time that destruction of the switches will occur, the greater the probability that desaturation will occur, in comparison to commanding switches off as soon as an overload is detected.

Further, by shunting the overload current to a neutral level a lower impedance path is offered to the overload current, thereby immediately desaturating the most outer switch remaining in an on-state, allowing the inverter bridge to be shut down quickly and safely.

BRIEF DESCRIPTION OF THE DRAWINGS

FIGS. 6A, 6B, 7A, 7B, 8A, and 8B illustrate a flow diagram of exemplary embodiments for controlling an inverter bridge.

DETAILED DESCRIPTION OF EXEMPLARY EMBODIMENTS

In the present disclosure, in the context of switching, the terms "on-state," "conducting," and "closed" are interchangeable, as are the terms "off-state," "non-conducting," and "open".

FIGS. 6A, 6B, 7A, 7B, 8A, and 8B are a flow diagram illustrating exemplary embodiments for controlling an inverter bridge. The embodiments focus on a single phase output of the inverter bridge, representative of what is done for each of the three phase outputs.

Figure 6B:
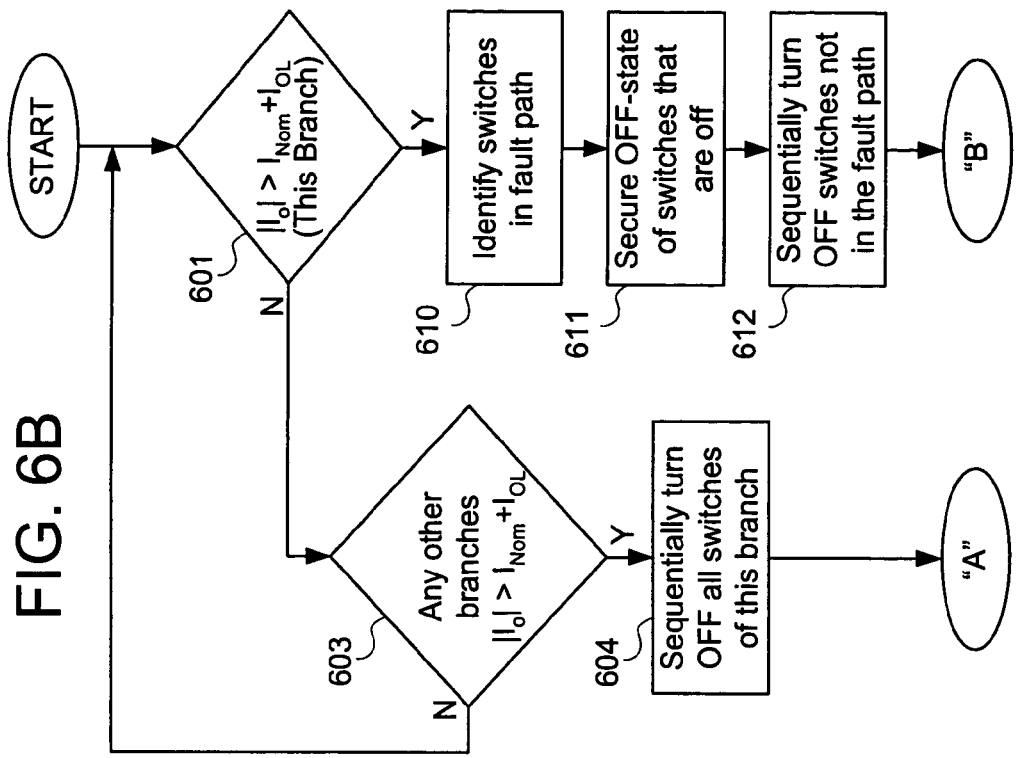
Figure 6A:
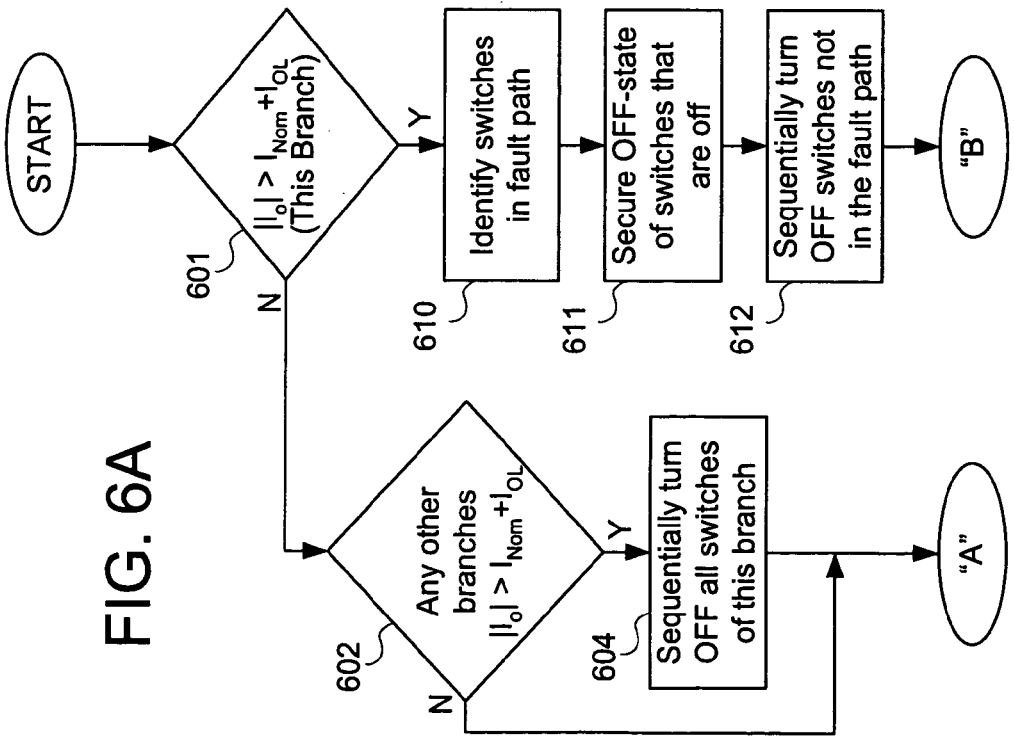

Referring to FIG. 6A, the instantaneous output current $I_o$ of the phase is compared to a rated nominal current the rated nominal current ($I_{Nom}$) of switches of the branch plus an overload current threshold ($I_{OL}$) (step 601). $I_{Nom}$ is the nominal maximum current (100% current) that a switch can withstand without regard to temperature (provided the temperature is inside the rated range of the switch). In comparison, $I_{max}$ is a maximum rated current of the switches of the branch, which typically is a maximum continuous current a switch can withstand and be safely turned-off. Typically, $I_{max}$ is 200% of the nominal current, and represents the threshold above which turn-off is not allowed when the switch is not desaturated.

The selection of $I_{OL}$ depends upon considerations such as the fault sensitivity desired for a specific application, but $I_{OL}+I_{Nom}$ should satisfy $I_{max}>I_{OL}+I_{Nom}\geq I_{Nom}$ By selecting a large $I_{OL}$, the number of nuisance ("false positive") short-circuit detections is reduced, but the chances of successfully shutting down before the instantaneous current $I_o$ reaches $I_{max}$ is decreased since there is less time to respond and shut switches off before entry into the region in which $|I_o|>I_{max}$ in case of a Type II fault. In comparison, by selecting a small $I_{OL}$, system sensitivity to short circuits is increased, and the chances of successfully shutting down before reaching saturation is increased. However, the compromise made by increasing sensitivity is nuisance shut downs caused by operational fluctuations in the load. A preferred value for $I_{OL}+I_{Nom}$ is 125% of the nominal current.

If $I_o$ has not exceeded $I_{OL}+I_{Nom}$ in the branch under examination, the branch is presumed not to be experiencing a fault or short-circuit. Preferably, a check is made as to whether any of the other branches are experiencing a fault (step 602). If there is a fault in one of the other branches, the original branch is sequentially shut down in the conventional fashion (step 604). If the method is implemented as a periodic check in a single-pass manner, then once the branch is shut down, or if no faults are detected, the procedure for that branch is over. In the alternative, as shown in FIG. 6B, initial fault detection handling for a branch can be implemented as a continuous loop, where the branches are continually checked for fault conditions (loop formed by steps 601 and 603).

If a fault is detected, ($|I_o|>I_{Nom}+I_{OL}$), several steps are performed to shut down switches that are not in the overload path. The switches in the fault path are identified (step 610), any switches that are already off (non-conductive) are secured in the off-state (step 611), and switches that have an on-state, but are not conducting $I_o$, are sequentially switched off from outer-to-inner in the conventional fashion (step 612).

Figure 7A:
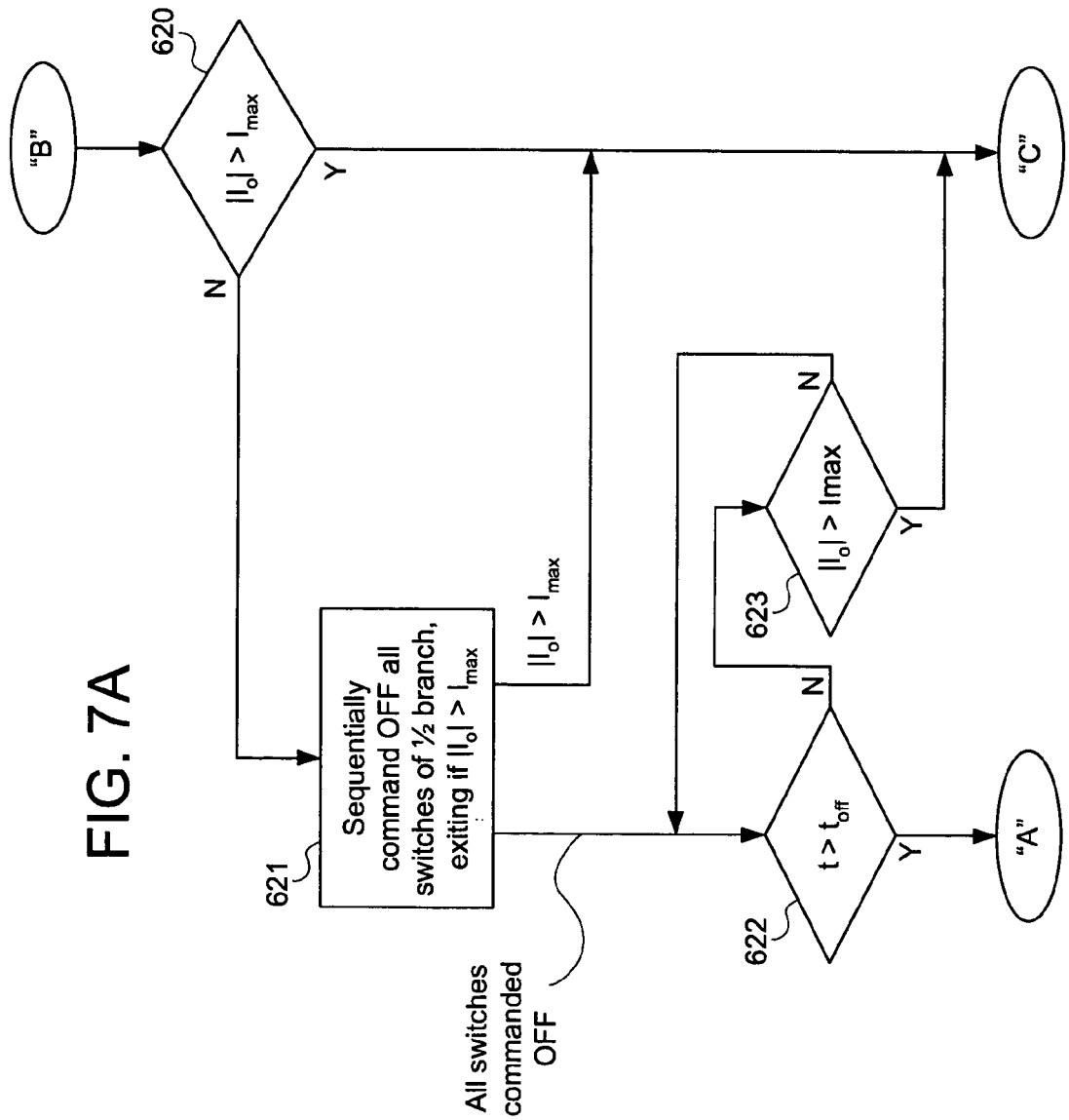

As shown in FIG. 7A, instantaneous output current $I_o$ is also compared to $I_{max}$ (step 620). If the instantaneous current $I_o$ crossing over $I_{Nom}+I_{OL}$ has not exceeded $I_{max}$, the switches can be shut down sequentially in a conventional manner (step 621). However, as is the case during ordinary operation, the switches must be shut off sequentially to avoid that a switch is biased at a voltage that exceeds the switch's maximum operating voltage. For an IGBT or BJT, this maximum operating voltage is $V_{ce\ max}$. In view of this need for sequential switching, and since a switch commanded off does not actually stop conducting until $t_{off}$ (a sum of a turn-off delay time of the switch plus the current fall-time) elapsed, the instantaneous output current must be continually monitored during the sequential shut down to assure that the switch current does not exceed $I_{max}$ during shut down (step 621). Once the last switch is commanded off, even though the $I_{max}$ current level has not been detected, it is still necessary to monitor whether the instantaneous output current $I_o$ exceeds $I_{max}$ until $t_{off}$ has transpired (steps 622, 623), due to the delay between commanding a switch off and when the switch actually stops conducting current.

Figure 7B:
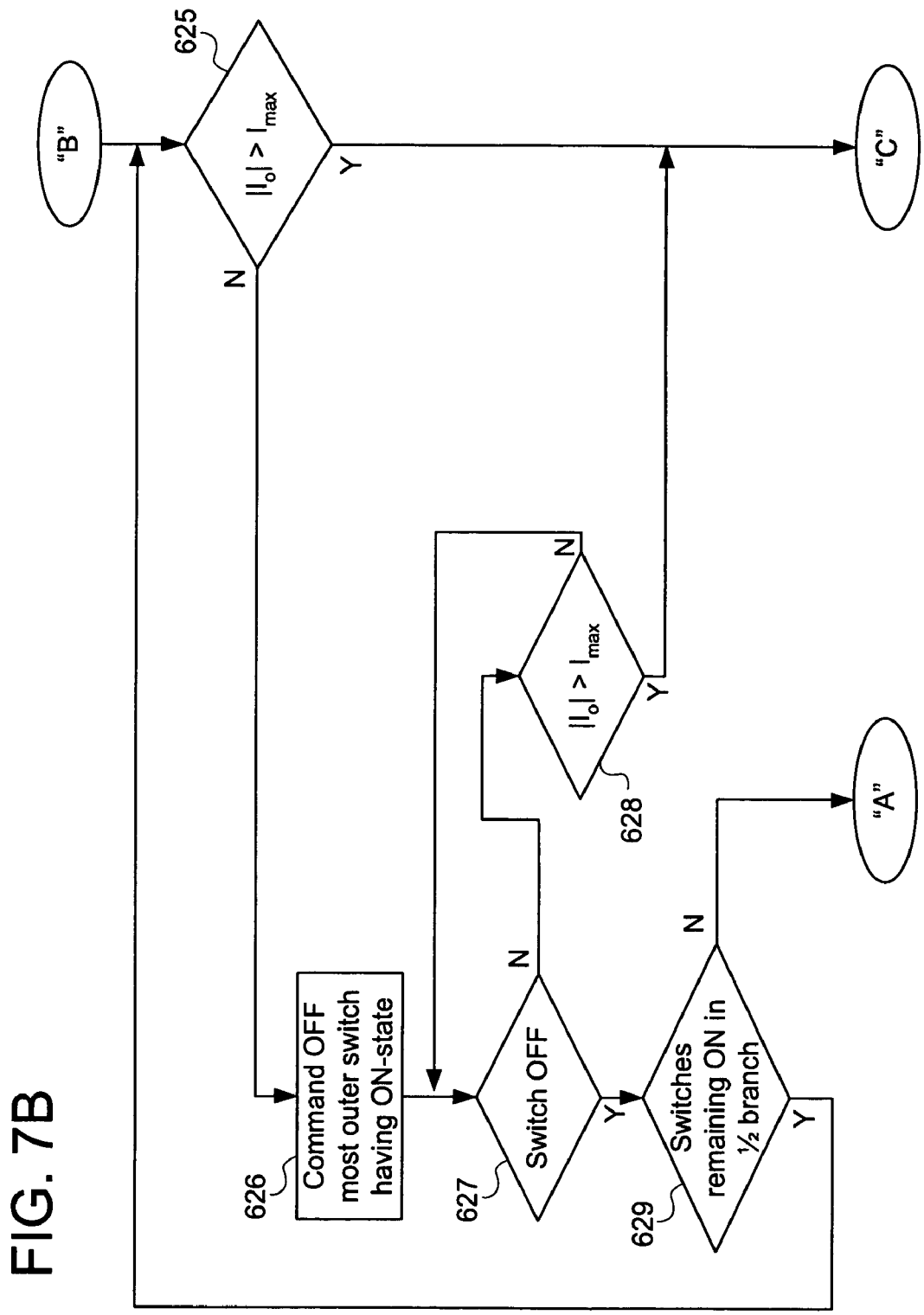

FIG. 7B is an alternative approach to the procedure shown in FIG. 7A. Whereas a conventional sequential switch shut-off procedure may command off an outer switch in a half-branch, and then command off the next switch in the half-branch before $t_{off}$ is reached for the outer switch, FIG. 7B illustrates a simple procedure which completely shuts off each switch before proceeding to the shut off of the next switch. The instantaneous output current $I_o$ is compared to $I_{max}$ (step 625). If $I_o$ has not reached the $I_{max}$ level, the most outer switch having an on-state is commanded off (step 626). A loop is then entered, waiting for the switch to shut completely off (step 627), while continually checking to assure that the $I_o$ does not reach the $I_{max}$ level (step 628). Once the switch is completely off, if there are any switches remaining in the half branch having an on-state (step 629), shut-off continues by repeating the process on the most outer switch having an on-state (i.e., next switch inward from the last switch that was shut off).

While the half-branch shut-down routine of FIG. 7B is conceptually simpler than the a conventional sequential shut-down (step 621 in FIG. 7A), a longer time is likely required before the branch is completely shut off. Accordingly, the chances of $I_o$ reaching $I_{max}$ during the shut down sequence is increased. However, if a two-level inverter is being shut down, the time to complete the processes in FIGS. 7A and 7B are substantially identical, since there is only one switch to shut off in a half-branch.

As shown in FIG. 8A, if $I_o$ does exceed $I_{max}$, while a switch in the path of $I_o$ has entered into saturation, a different shut down routine is initiated. A most-outer switch remaining in an on-state (conducting) is checked for desaturation (step 630). If the most-outer switch having an on-state is desaturated, the switch is turned off. Preferably, turning the switch off comprises commanding the switch off (step 631), and then checking whether the switch has shut off (step 633) and whether the switch is no longer desaturated (step 634). If the switch becomes saturated after being commanded off, the switch is commanded back on (step 640). Otherwise, once the switch is off, a check is made as to whether any switches in the half-branch remain on (step 636). If switches remain on, the process is repeated for the next most-outer switch remaining on, returning to step 620 (FIG. 7A) or step 625 (FIG. 7B).

If after checking for desaturation (step 630), the most outer switch remaining in an on-state is not desaturated, the most outer switch having an on-state is kept on, or commanded on, as well as all switches of the half-branch between the most outer switch having the on-state and the phase output (step 640). Then a wait begins, lasting until an earlier of an expiration of a delay period (step 650) or the desaturation of the most outer switch having the on state. The delay period preferably corresponds to a time for a temperature of the most outer switch remaining in an on-state to reach a maximum rated temperature value. Preferably, if a pre-set delay is used and the switches are BJTs or IGBTs, then as illustrate in FIG. 8A the delay period approximately equals:

$$\frac{t_{sc\cdot max} \times V_{ce\cdot sat}}{V_{ce\cdot max}}$$

where $V_{ce\ max}$ is defined as a maximum rated collector-to-emitter voltage of the switch, $I_{sc}$ is defined as a maximum rated short circuit current per switch, and $t_{sc\ max}$ is defined as a rated maximum short-circuit time duration which the switch can withstand when submitted to $V_{ce\ max}$ and $I_{sc}$.

Figure 8B:
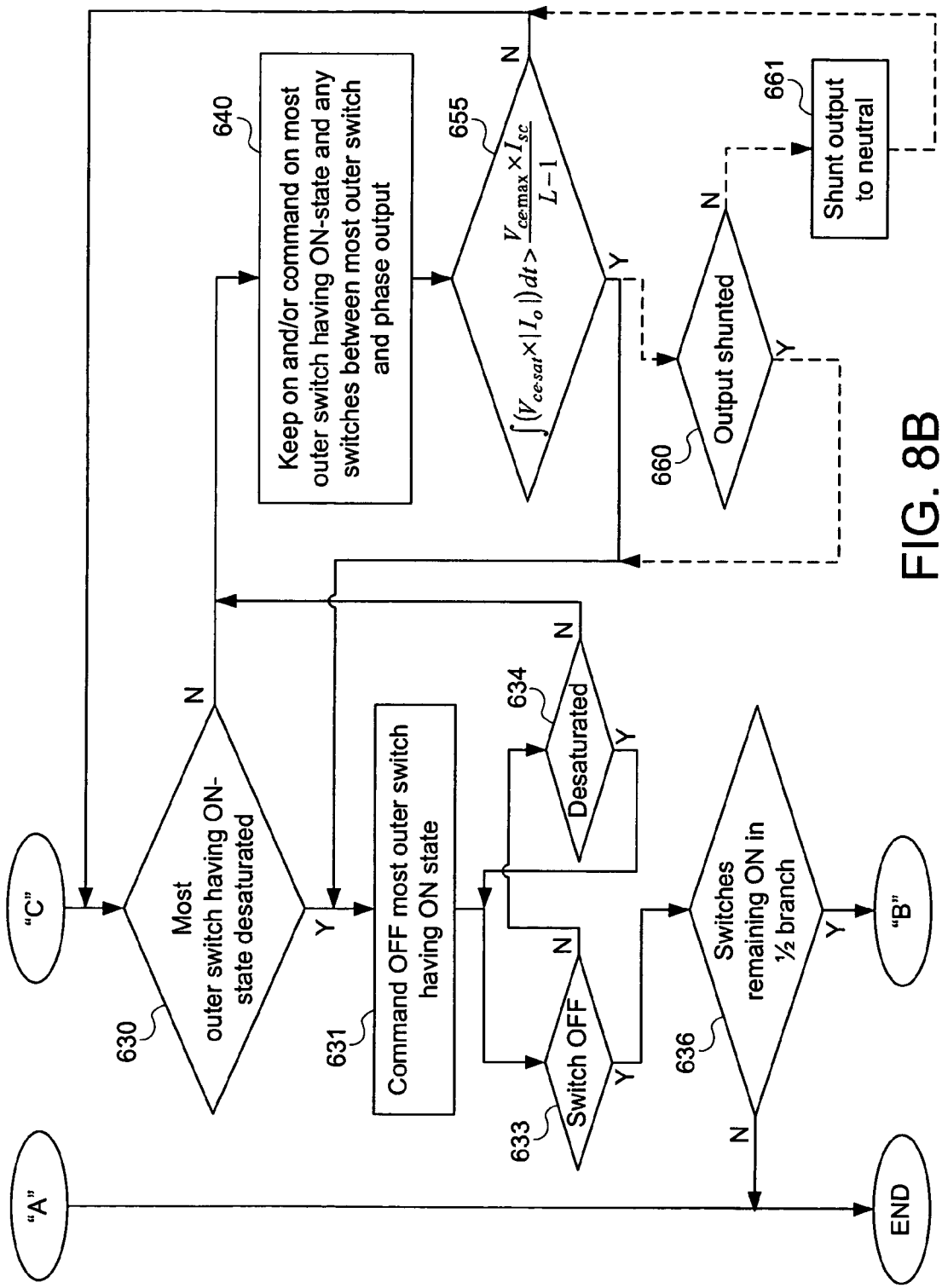

In comparison, if a feedback-based delay is used as shown in FIG. 8B (step 655), then the delay period should approximately be:

$$\int (V_{ce\cdot sat} \times |I_o|)dt > \frac{V_{ce\cdot max} \times I_{sc}}{L-1}$$

An advantage of feedback-based delay is it can be more accurate, since current level information is continually acquired and constantly updated.

Conceptually, by waiting as long as possible before switching off a saturated switch, the probability of desaturation occurring increases, thereby statistically improving the survivability of the switch, so long as the switch is not destroyed in the interim. Any method of determining such a delay, whether pre-set or feedback-based, may be suitably utilized.

As a further improvement, if either delay period (steps 650 or 655) expires, the phase output is shunted to a neutral voltage level (steps 660, 661). Shunting the phase output converts a Type II fault into a Type I fault, which should force the switches to desaturate. Shunting the phase output further improves the survivability of the switches of the inverter bridge.

Figure 9:
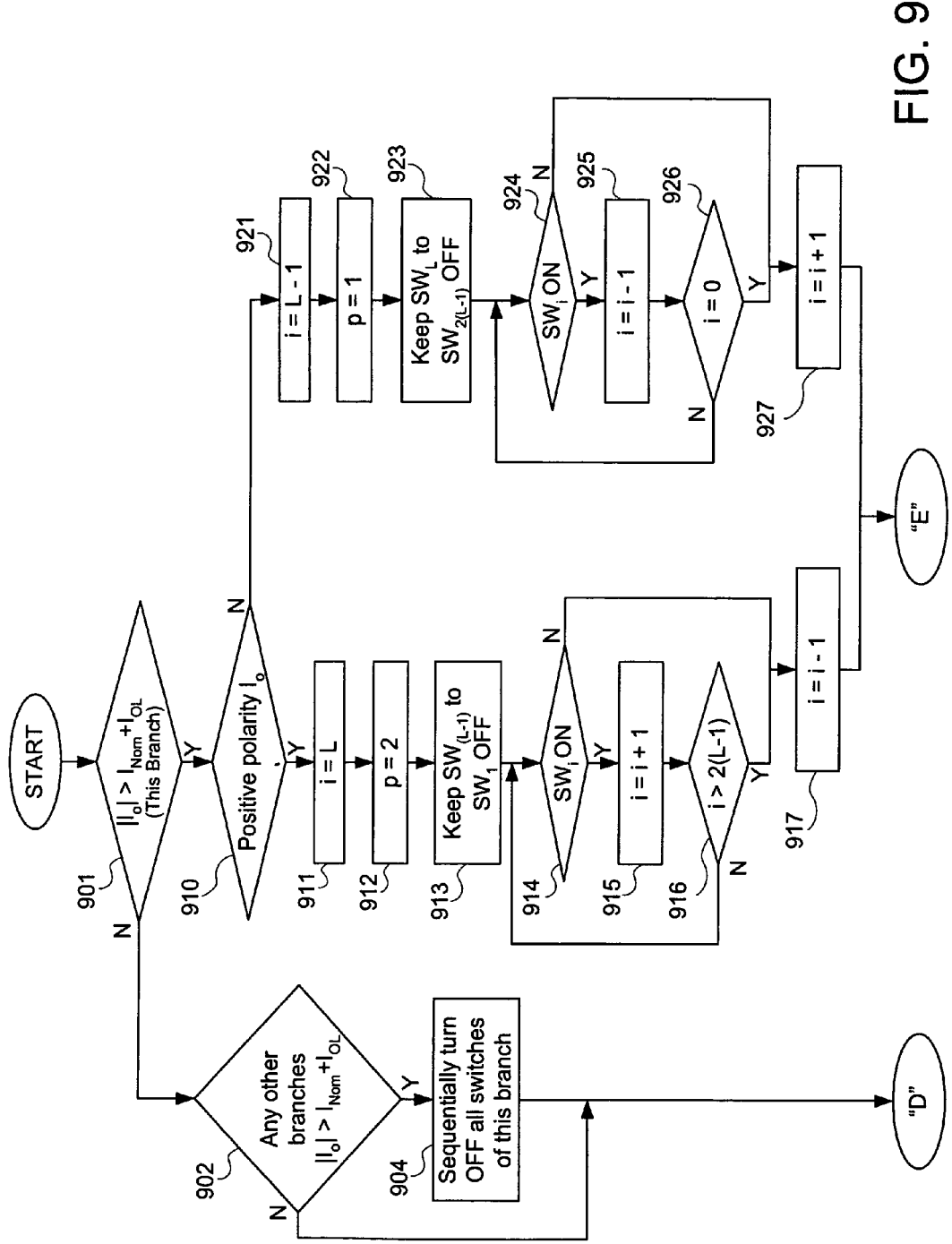
FIGS. 9, 10, and 11 are a flow diagram according to another exemplary embodiment for controlling an inverter bridge.
Figure 10:
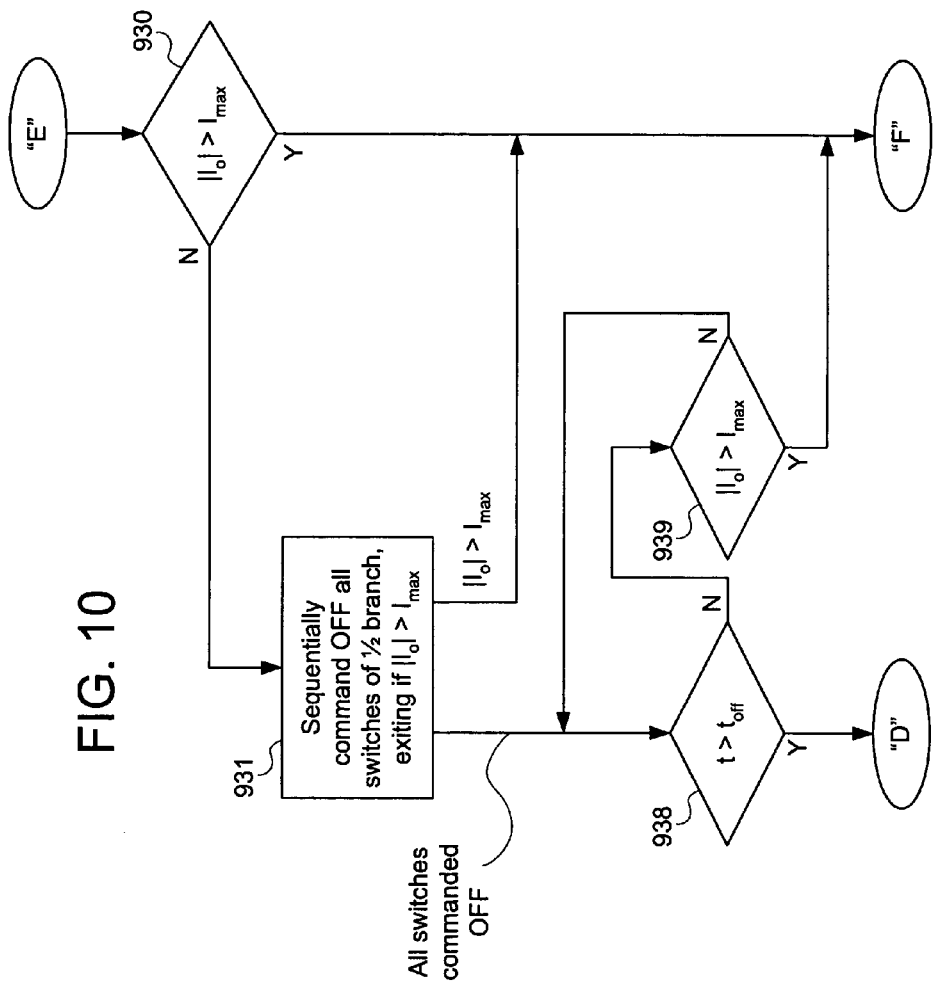
Figure 11:
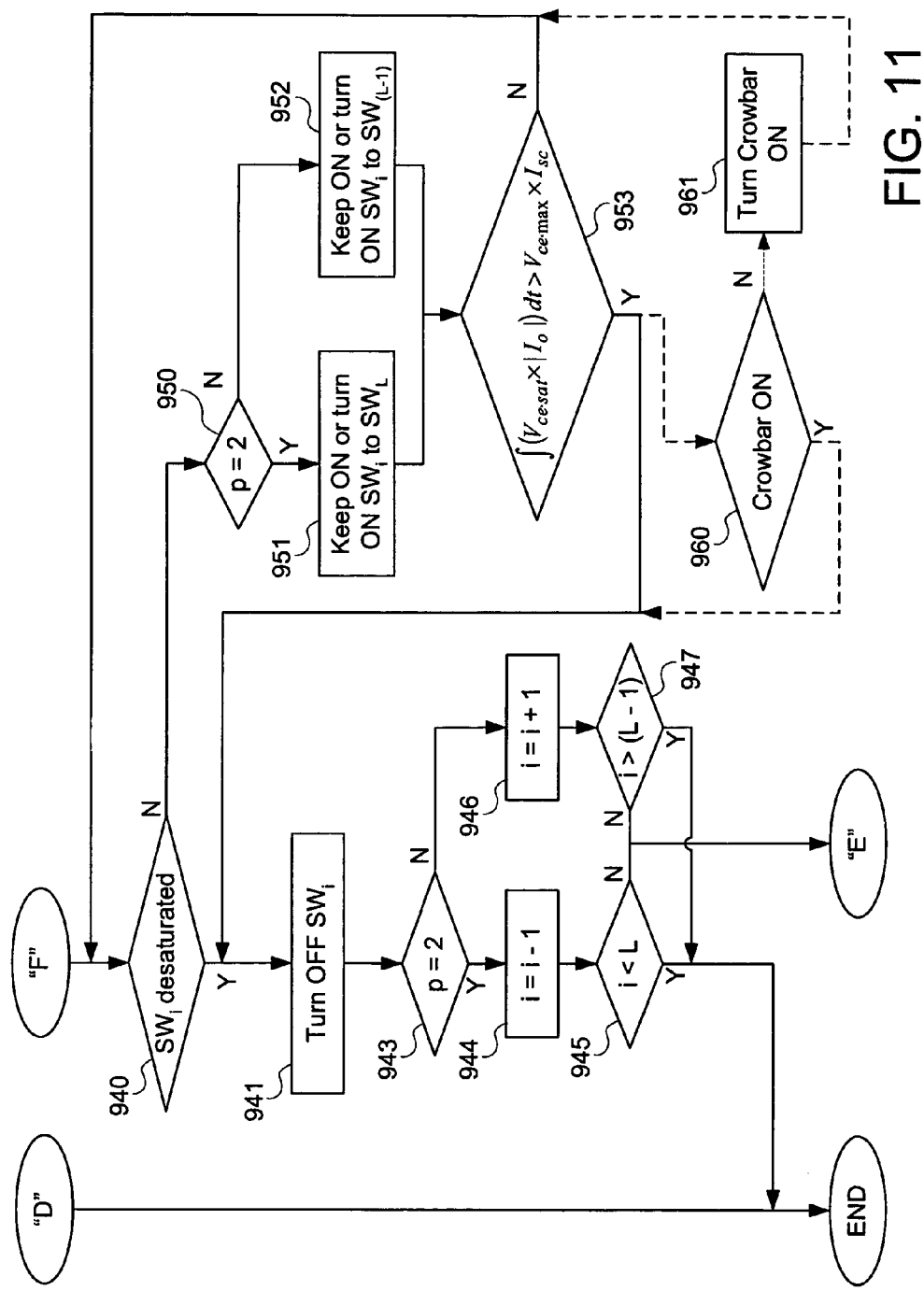

FIGS. 9, 10, and 11 are a flow diagram of another exemplary embodiment for controlling an inverter bridge, illustrating an implementation of the method of FIGS. 6A, 7A, and 8B including the use of indexing variables.

Referring to FIG. 9, the instantaneous output current $I_o$ of the phase is compared to a rated nominal current the rated nominal current ($I_{Nom}$) of switches of the branch plus an overload current threshold ($I_{OL}$) (step 901). If $I_o$ has not exceeded $I_{OL}+I_{Nom}$ in the branch under examination, a check is made as to whether any of the other branches are experiencing a fault (step 902). If there are not faults, the procedure can either end (as illustrated) or be repeated from step 901. If there is a fault in one of the other branches, the original branch is sequentially shut down in the conventional fashion (step 904).

If a fault is detected, ($|I_o|>I_{Nom}+I_{OL}$), a determination of polarity of the fault current is made in order to determine which half branch is conducting $I_o$ (step 910). If the instantaneous current is positive, the fault lies in the positive-side half-branch, whereas if the instantaneous current is negative, the fault lies in the negative-side half-branch.

If the fault is in the positive-side half-branch, a variable "i" is set equal to the number of levels "L" in the inverter bridge (step 911), and a variable "i" is set equal to two (step 912). Referring to the switch numbering pattern used in the present disclosure in which, for each branch, switch 1 is the switch closest to the most-negative bus, and switch 2(L−1) is the switch closest to the most-positive bus, switches (L−1) to 1 are kept off (step 913), corresponding to the switches of the half-branch between the most negative bus and the phase output.

A determination is made as to whether switch "i" has an on-state (step 914). If switch "i" is on, Variable "i" is then incremented (step 915) and a check is made to determine whether "i" has exceeded the number of switches in the branch (i>2(L−1)) (step 916). If "i" has not exceeded the number of switches in the branch, the loop is repeated from step 914. If "i" has exceeded the number of switches in the branch (step 916), or if an outer switch of the positive-side half-branch is off (step 914), "i" is decremented (step 917). By decrementing "i" (step 917), the value of "i" is set to reference the most outer switch of the half branch remaining in an on-state.

In comparison, if the negative-side half-branch is conducting the fault current, then at step 921, the value of "i" is set to the reference number of the innermost switch of the negative-side half-branch (i=L−1). A variable "p" is set equal to 1 at step 922. Switches L to 2(L−1) are kept off (step 923), corresponding to the switches of the half-branch between the most positive bus and the phase output.

A determination is made as to whether switch "i" has an on-state (step 924). If switch "i" is on, Variable "i" is then decremented (step 925) and a check is made to determine whether "i" equals zero (step 926). If "i" is not zero, the loop is repeated from step 924. If "i" is zero (step 926) or if an outer switch of the negative-side half-branch is off (steps 924), "i" is incremented (step 927). By incrementing "i" (step 927), the value of "i" is set to the reference the most outer switch of the half branch remaining in an on-state.

Although not shown, if an inner-most switch of a half-branch conducting the instantaneous current $I_o$ is determined to be off (non-conducting), the process can either end or be repeated from step 901. However, such an occurrence may indicate a sensor failure, including a failure in the circuit monitoring the output current or the circuit monitoring the innermost switch. One approach to handling such an occurrence would be to set "i" to indicate the outermost switch of the half-branch, and proceed with sequential shut-down.

As shown FIG. 10, instantaneous output current $I_o$ is compared to $I_{max}$ (step 930). If the instantaneous current $I_o$ crossing over $I_{Nom}+I_{OL}$ has not exceeded $I_{max}$, the switches can be shut down sequentially in a conventional manner (step 931). However, since a switch commanded off does not actually stop conducting until $t_{off}$, the instantaneous output current must be continually monitored during the sequential shut down to assure that switch saturation does not occur during shut down (step 931). Once the last switch is commanded off, even though the $I_{max}$ current level has not been detected, it is still necessary to monitor whether the instantaneous output current $I_o$ exceeds $I_{max}$ until $t_{off}$ has transpired (steps 938, 939), since there is a delay between commanding a switch off and when the switch actually stops conducting current.

As shown in FIG. 11, if $I_o$ does exceed $I_{max}$, a most-outer switch remaining in an on-state is checked for desaturation (step 940). If the most-outer switch having an on-state is desaturated, the switch is turned off (step 941).

A check is made as to whether any switches in the half-branch remain on, and if switches remain on, the process is repeated for the next most-outer switch remaining on, returning to step 930 (FIG. 10). This is performed by checking to see if "p" is equal to two (step 943), and if it is, decrementing "i" (step 944) and checking to make sure that "i" is not less than the reference number of the innermost switch of the positive half branch (step 945). If "p" is not equal to two, "i" is incremented (step 946) and a check is made to make sure that "i" is not greater than the reference number of the innermost switch of the negative half branch (step 947).

If after checking for desaturation (step 940), the most outer switch remaining in an on-state (SW$_i$) is not desaturated, the most outer switch having an on-state is kept on, or commanded on, as well as all switches of the half-branch between the most outer switch having the on-state and the phase output (steps 950, 951, 952). Then a wait begins, lasting until an earlier of an expiration of a delay period (step 953) or the desaturation of the most outer switch having the on state. The delay period corresponds to a time for a temperature of the most outer switch remaining in an on-state to reach a maximum rated temperature value. A feedback-based delay is used (step 953), wherein the delay period is approximately:

$$\int (V_{ce\cdot sat} \times |I_o|) dt > \frac{V_{ce\cdot max} \times I_{sc}}{L-1}$$

As a further improvement, if the delay period (step 953) expires, the phase output is shunted to a neutral voltage level (steps 960, 961) using a crowbar circuit, which is described further below. Shunting the phase output converts a Type II fault into a Type I fault, which should force the switches to desaturate and further improve the survivability of the inverter bridge.

Figure 12:
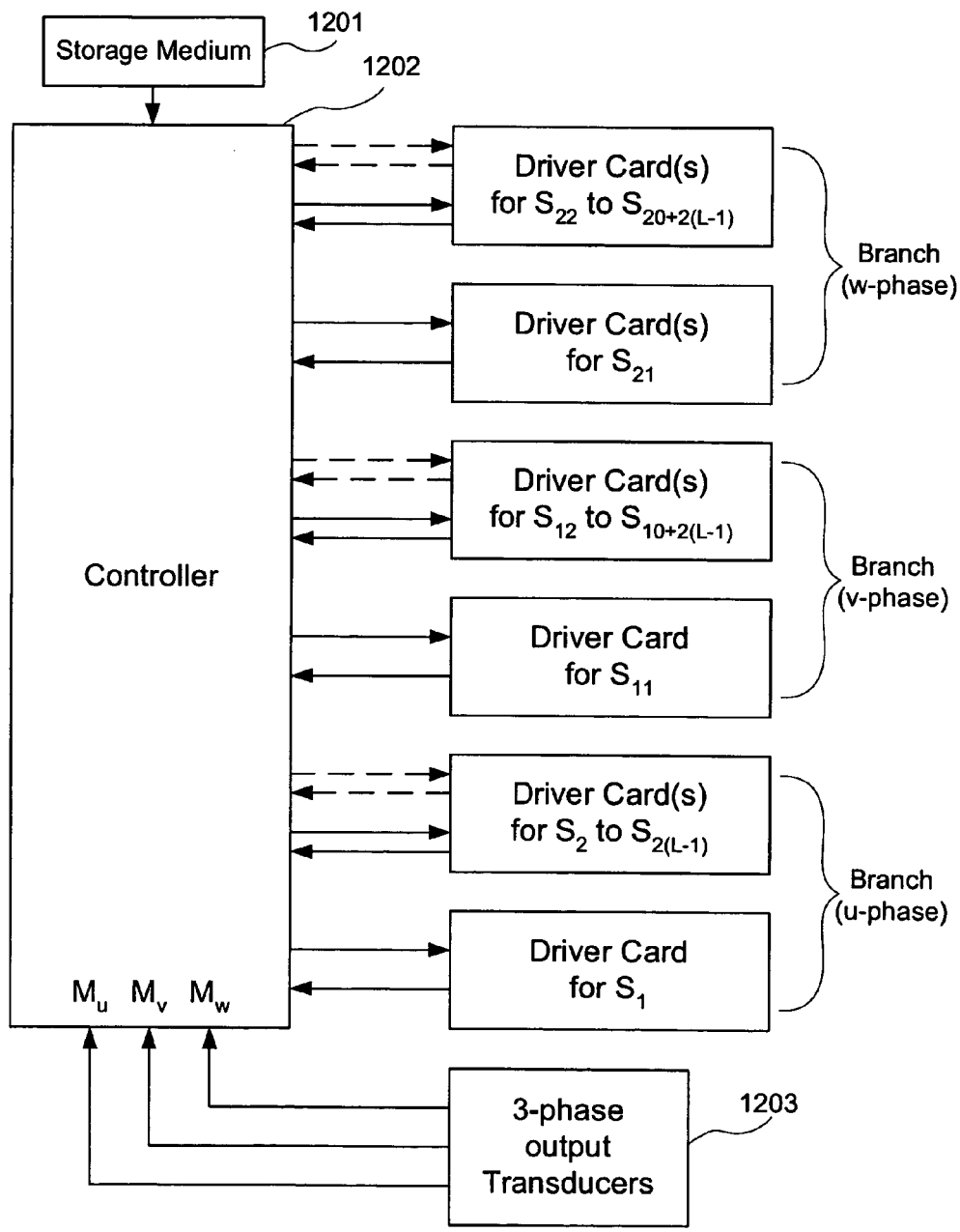
FIG. 12 illustrates an exemplary embodiment of the controller interfacing with driver cards and inverter-bridge output transducers according to the present invention.
Figure 13:
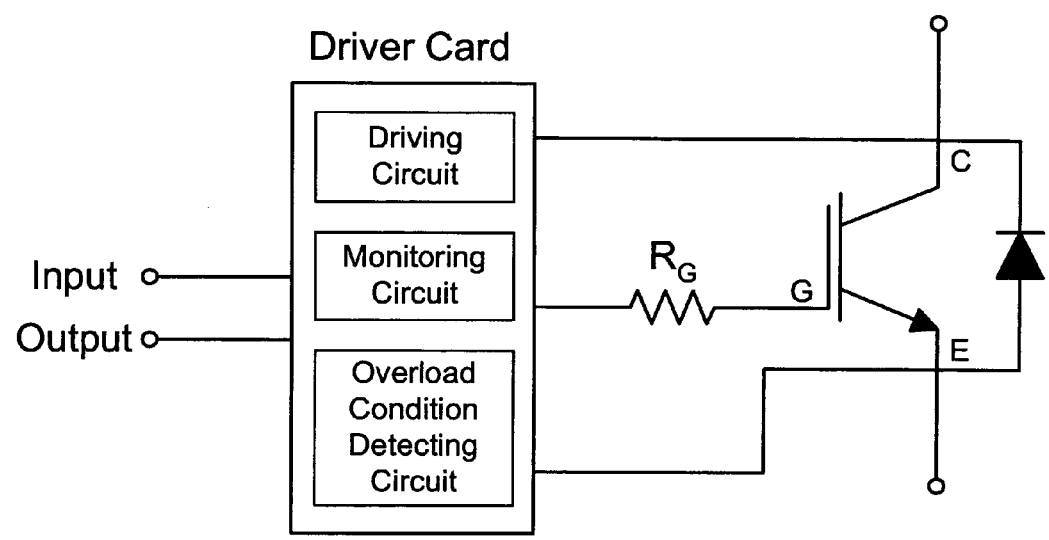
FIG. 13 illustrates a driver card connected to an IGBT.
Figure 14:
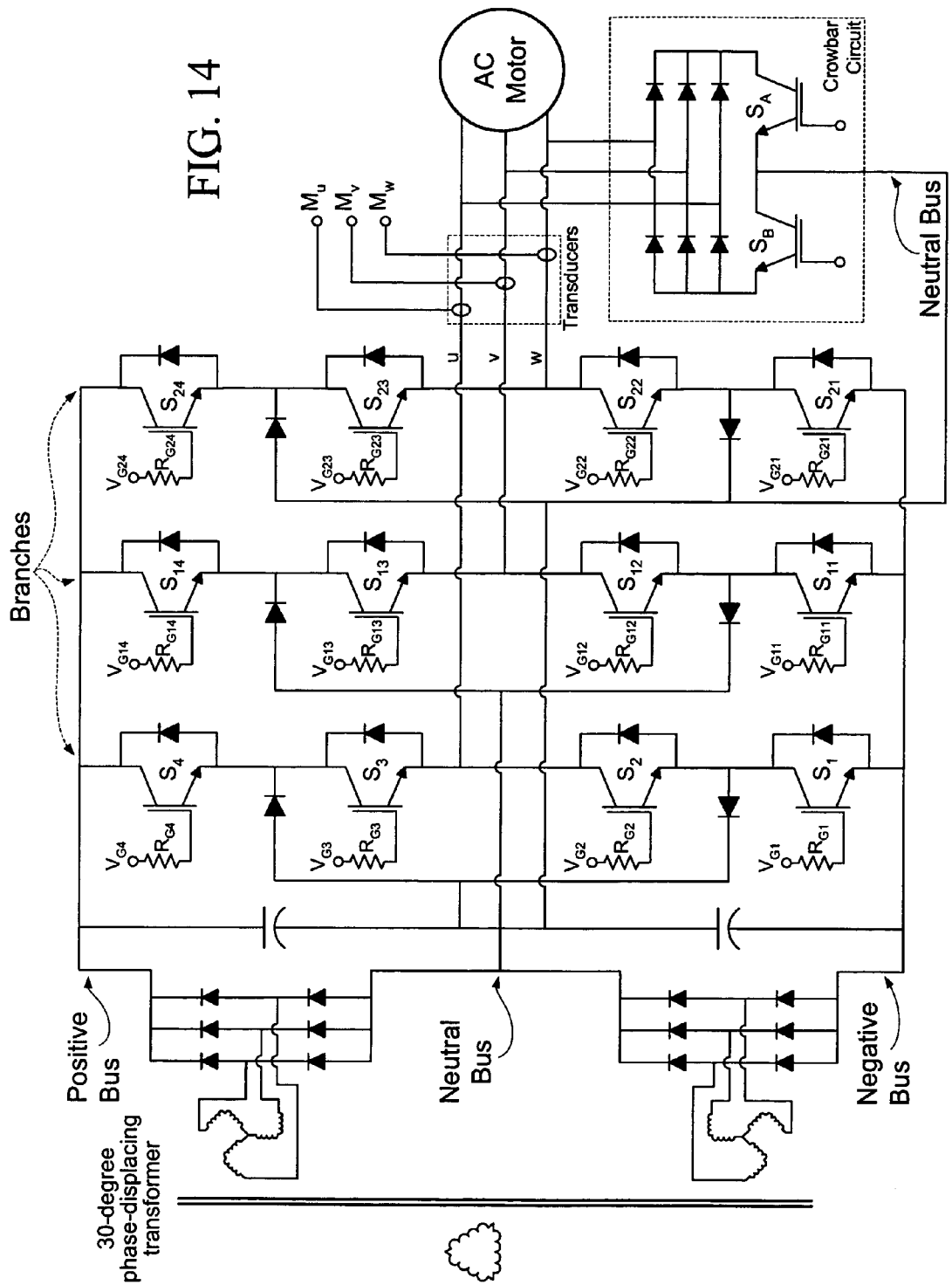
FIG. 14 illustrates an inverter bridge modified, according to the present invention, with output transducers and a "crowbar" protection circuit.

FIGS. 12, 13, and 14 illustrate further exemplary embodiments of the present invention. FIG. 12 is a block diagram of the controller 1202, operating in conjunction with a storage medium 1201, various driver cards connected to switches of an inverter bridge, and signals provided from transducers 1203 monitoring the three-phase output of the inverter bridge. FIG. 13 is an exemplary diagram of a conventional driver card. FIG. 14 illustrates a three-level inverter bridge including the output transducers and a crowbar circuit.

The controller can be built from analog and/or digital circuits and discrete logic, and/or programmed into a programmable logic device such as a Digital Signal Processor (DSP), a microcontroller, a microprocessor, or a Complex Programmable Logic Device (CPLD) in accordance with the methods, procedures, and structures disclosed in any of the embodiments described herein. Optional storage medium 1201 can contain software or firmware implemented by or on the controller 1202, and can either be external or internal to the controller. A further embodiment of the invention is the storage medium 1201 containing a set of program instructions for the controller for implementing any of the methods, procedures and/or circuits in any of the embodiments disclosed herein.

A plurality of driver cards is utilized. The controller 1202 also collects data about each switch from the plurality of "driver cards" (also known as "gate cards") conventionally used to drive the switches of an inverter bridge. Each driver card includes a driving circuit to drive a switch of the inverter bridge, as illustrated in FIG. 13. Each driving circuit provides an excitation control signal driving the respective switch to an on-state or an off-state. As examples of excitation control signals, if an embodiment utilizes IGBTs as switches, each excitation control signal is a voltage applied between a gate and an emitter of a respective IGBT; if the switches are FETs, each excitation control signal is a voltage applied between a gate and a source of a respective FET; and if the switches are BJTs, each excitation control signal is a current applied between a base and an emitter of a respective BJT.

The driver cards preferably each include a monitoring circuit, monitoring either a voltage across a respective switch in an on-state or a current through a respective switch in an on-state. For example, if an embodiment utilizes IGBTs, FETs, or BJTs as inverter switches, each monitoring circuit preferably at least monitors a voltage across a respective switch in an on-state.

By setting comparing a threshold value to the monitored voltage value across a switch, a driver card is able to determine whether a switch is desaturated. Specifically, when a switch is in an on-state and the voltage across the switch is above the threshold level (e.g., IGBT $V_{ce}$>5V), the switch is considered desaturated. The driver card preferably outputs a signal to the controller 1202 indicating saturation/desaturation and whether the switch is conducting or not conducting.

Also, the driver cards preferably each include an overload condition detecting circuit, detecting an overload condition by comparing a voltage or current of the respective switch in the on-state with a threshold level. In an inverter bridge using IGBTs, the driver cards monitor IGBT gate voltage, providing a measure of the instantaneous current through the IGBT. When a Type I fault is detected during operation of an IGBT, a typical gate card is equipped to automatically switch the IGBT off. Driver/gate cards providing feedback regarding saturation/desaturation, conduction state, and overload detection are known in the art.

Additionally, the driver/gate cards and/or the controller 1202 preferably also make a determination as to whether a switching fault has occurred. Such a fault occurs when a switch is commanded to an off-state, but remains conductive, indicating that the switch has failed. A simple way of determining such a fault is measuring whether time $t_{off}$ is exceeded after a switch is commanded to an off-state, but the switch is still conducting.

The controller 1202 also receives the instantaneous overcurrent status of all three phases to the load, as well as instantaneous information about each switch, allowing the logic circuitry of the controller 1202 to have advance notice of a fault condition.

The controller 1202 collects data about the load from galvanically isolated transducers provided for each phase to the load, and pinpoints the path of the excessive current by monitoring which phases experience overcurrent. Each transducer is capable of bi-directional current measurement (both DC and AC), and provides instantaneous measurement of the current to each phase. An example of such a transducer is a Hall-effect sensors such as an LEM. Each transducer should be rated for at least twice the drive output current.

Using the data from the transducers and driver cards, together with elapsed time and desaturation information, the controller provides advanced warning of a fault condition, and infers the type of overload with which it is dealing. By pinpointing the path of the excessive current by monitoring which phases experience overcurrent, if a given output phase shows an overcurrent condition ($|I_o|>I_{max}$), but no desaturation signal comes in from the gate card, then the inference is made that there is a Type II short circuit.

For example, referring to a three-level system, when a fault is detected ($|I_o|>I_{max}$), the controller 1202 will wait for the outer IGBT (i.e., IGBT closest to the positive or negative power bus) involved to desaturate. Once the outer IGBT desaturates, the corresponding gate driver will have begun the turning-off process by itself, although the controller 1202 will redundantly command the gate card for the outermost IGBT to switch off the transistor. The controller 1202 will account for the elapsed time from the issue of the overcurrent warning while it waits for a desaturation signal from the outer IGBT gate driver card. If the signal does not come after a maximum time and the outer gate card and/or output-monitoring transducers continue to show an output current that is larger than twice the rated current of the IGBT, the inner IGBT gate driver issues a desaturation fault and the controller 1202 will then know that that outer IGBT is defective, forcing the corresponding inner IGBT to turn-off. This mechanism is also used to detect a type II short-circuit.

Figure 15:
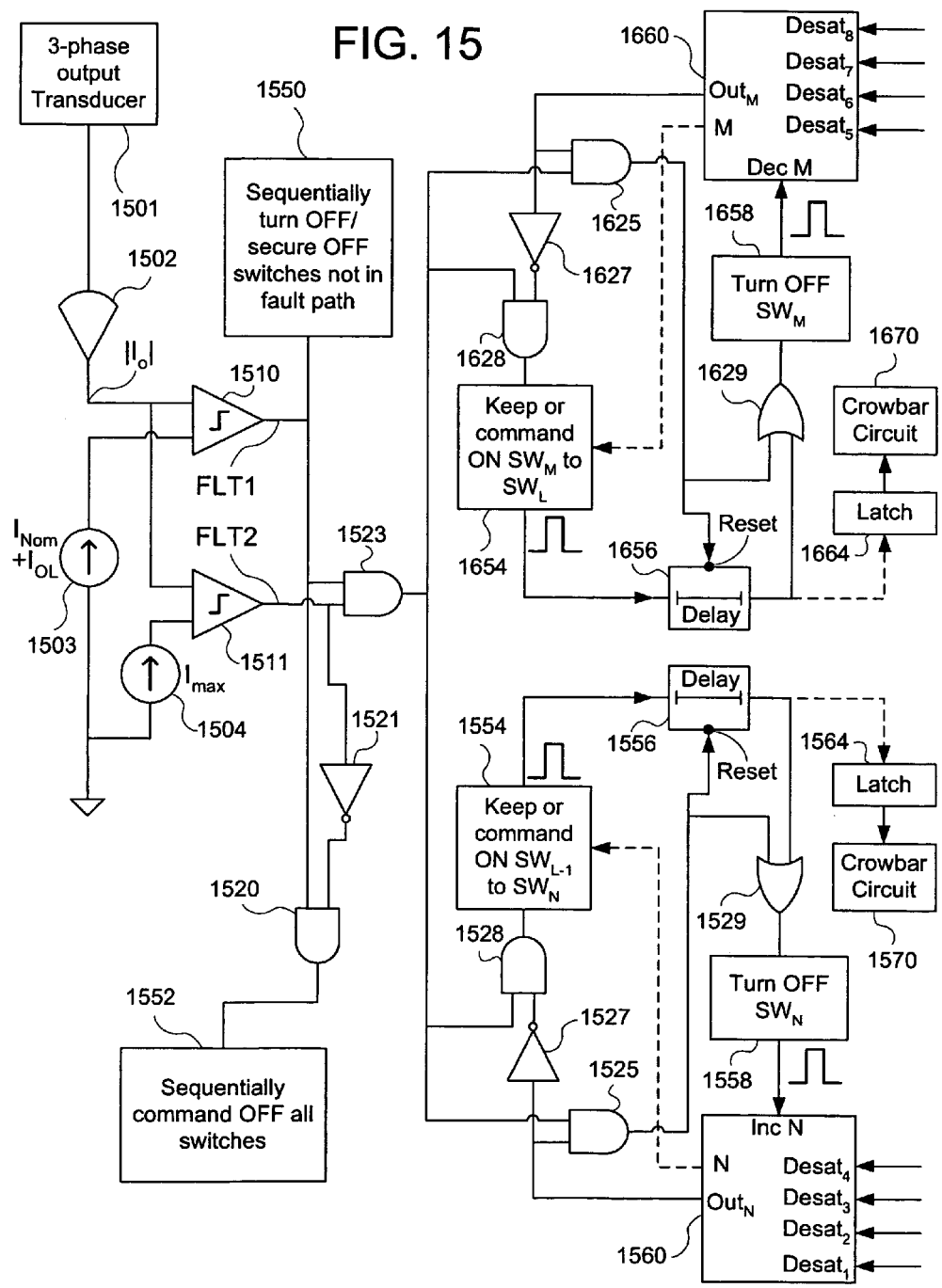
FIGS. 15 and 16 are logic diagrams of a controller for controlling an inverter bridge using desaturation signals provided by driver cards.
Figure 16:
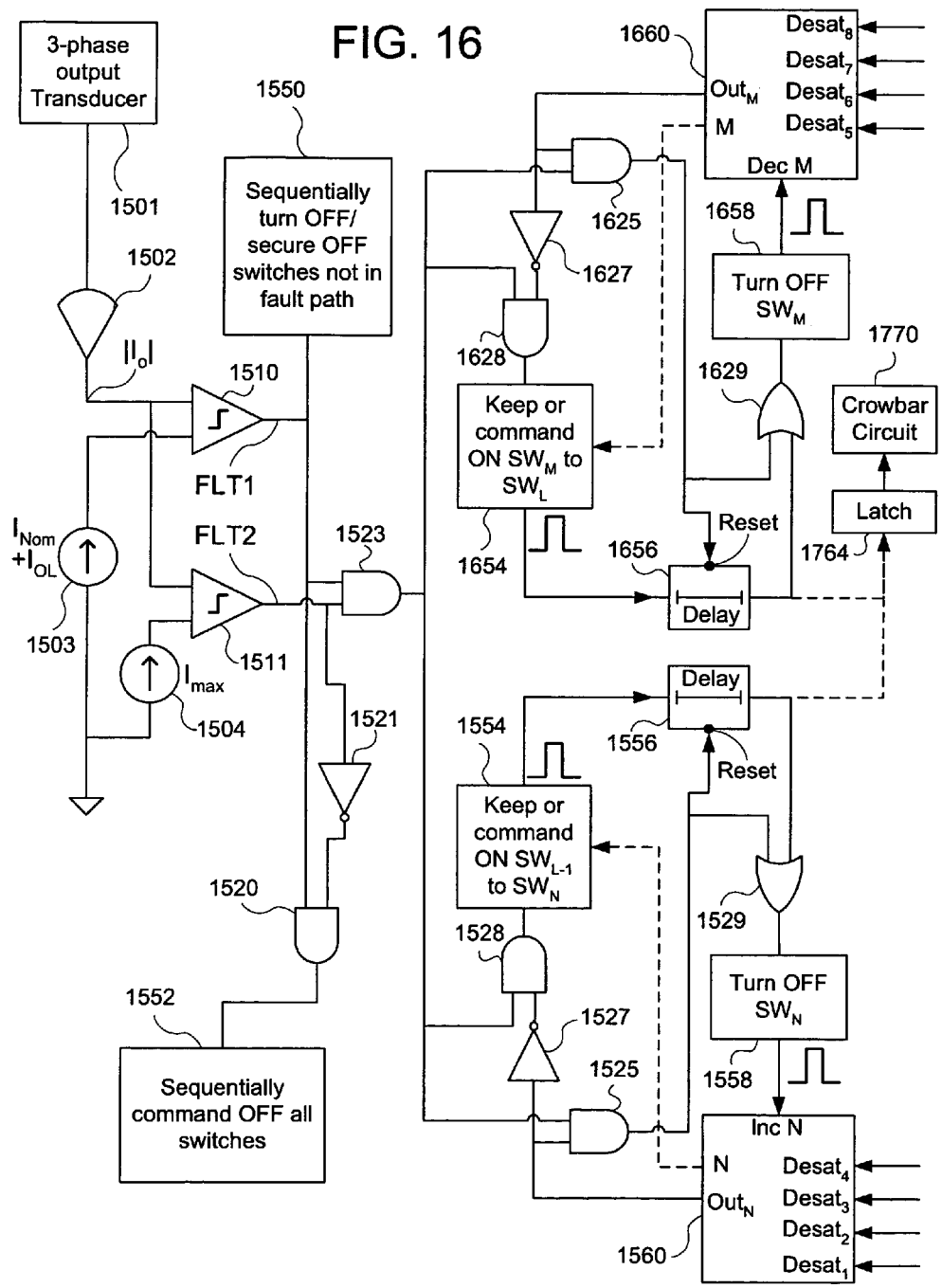
Figure 17:
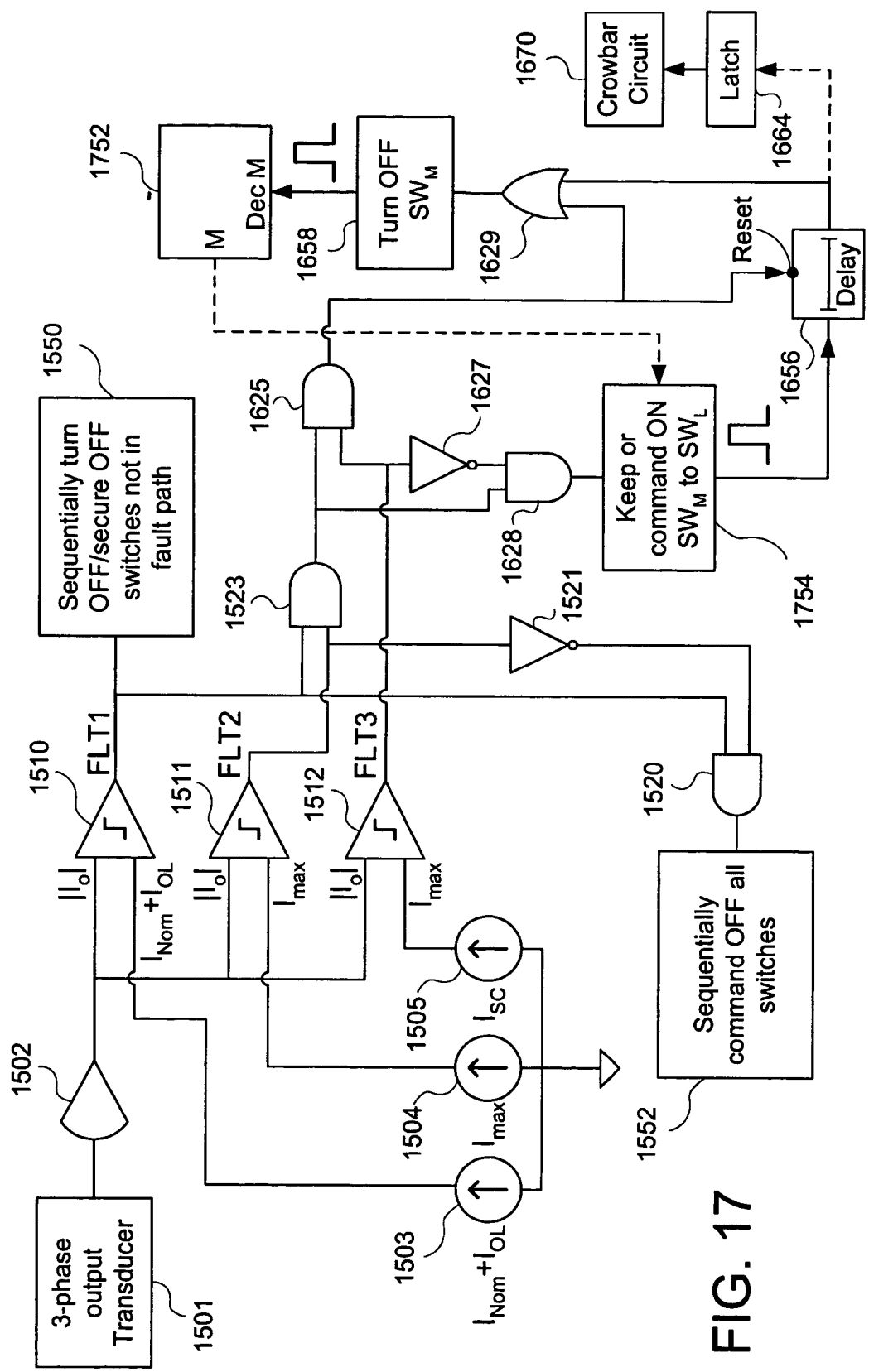
FIG. 17 is a logic diagram of a controller for controlling an inverter bridge determining desaturation based on output current.

Further embodiments of the controller are illustrated in FIGS. 15, 16 and 17. FIGS. 15 and 16 illustrate logic of the controller for controlling one branch of an inverter bridge using the desaturation signals provided by the gate cards. FIG. 17 illustrates logic of the controller for controlling one-half branch of the inverter bridge, without relying on the gate cards for desaturation signals. These embodiments of the controller can be implemented as either software, firmware, and/or hardware.

As shown in FIG. 15, two comparison circuits 1510 and 1511 are provided for monitoring a magnitude of the instantaneous output current $I_o$ of a phase of the three-phase outputs of an inverter bridge. A transducer output 1501 is passed through a buffer 1502 in order to compare a magnitude of $I_o$ with $I_{Nom}+I_{OL}$ (comparison circuit 1510) and with $I_{max}$ (comparison circuit 1511). If the magnitude of $I_o$ is greater than $I_{Nom}+I_{OL}$, then signal FLT1 is true; otherwise, FLT1 is false. Likewise, if the magnitude of $I_o$ is greater than $I_{max}$, then signal FLT2 is true, otherwise, FLT2 is false.

If FLT1 and FLT2 are false, then nothing happens. If FLT1 is true, then the logic circuit sequentially turns off and secures off the switches not in the fault path (1550). If FLT1 is true and FLT2 is false, then the logic circuit sequentially commands off all switches in a branch remaining in an on-state (1552). Since $I>I_{OL}+I_{Nom} \geq I_{Nom}$, it is possible that the that the logic circuit 1550 and logic circuit 1552 will simultaneously be active.

If FLT1 and FLT2 are true, sequential switch shut-down proceeds for a half-branch based on whether the switches are desaturated. Although an AND gate 1523 is illustrated to convey that $|I_o|>I_{Nom}+I_{OL}$ and $|I_o|>I_{max}$, as a practical matter, since $I_{max}>I_{Nom}$, FLT1 is necessarily true if FLT2 is true, such that AND gate 23 can be omitted in favor of FLT2 alone.

Two circuits are illustrated for shutting down switches when both FLT1 and FLT2 are true. A first circuit handles switches between a most-positive bus voltage level and the phase output (switches L to 2(L−1)), and a second circuit handles switches between a most-negative bus voltage level and the phase output (switches 1 to (L−1)).

Figure 5:
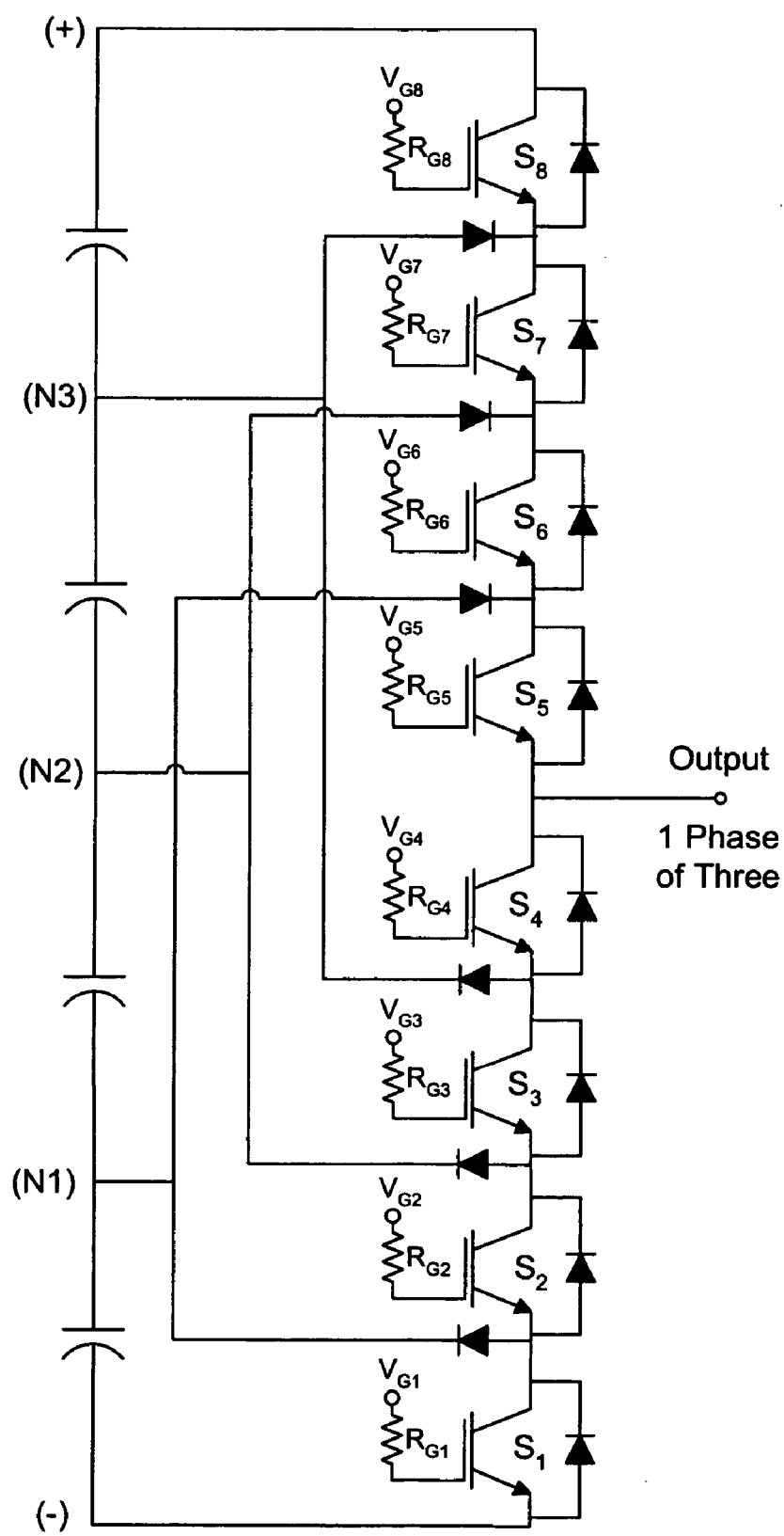
FIG. 5 illustrates a single branch of a five-level inverter bridge.

Referring to the first circuit, a multiplexer/counter 1660 receives signals from the driver card indicating whether switches of a half-branch are desaturated. As an example, four desaturation signals are input, as would be the case for a first half-branch of a five-level inverter branch as illustrated in FIG. 5. However, any number of levels may be used. If a two-level inverter bridge is used, the multiplexer/counter 1660 can be omitted, as the single desaturation signal can drive inverter 1627 and AND gate 1625 directly.

The output of the multiplexer/counter 1660 (Out$_M$) corresponds to the desaturation input of switch M. The multiplexer/counter 1660 is preferably initialized so that M is preset to the most-outer switch of the half-branch having the off-state. However, as will be understood from the from FIG. 15, even if M is initialized to the outermost transistor (i.e., switch 8 in FIG. 5), and the outermost transistor is fully off, the system would rapidly decrement M until reaching a most-outer transistor that is on, since a switch that is fully off is necessarily desaturated.

If FLT1 and FLT2 are true and switch M is not desaturated, logic circuitry (1654) keeps or commands on switches L to M. Logic circuitry 1658 then turns switch M off after a sooner of an expiration of a delay generated by a delay circuit (1656) and desaturation of switch M. After the switch is turned off, M is decremented, and the procedure repeats for the next switch.

If a crowbar circuit is present when the expiration of the delay from delay circuit 1656 occurs, then a latch 1664 turns on a crowbar circuit 1670. An exemplary crowbar circuit is illustrate in FIG. 14. Preferably crowbar circuit 1670 comprises Switch A in FIG. 14, so that when a switch between the most-positive bus level and the phase output is conducting the fault current, the positive portion of the phase output is shunted to a neutral voltage level.

The second circuit operates in the same way, except that a multiplexer/counter 1560 increments N so that desaturation signals are output (Out$_N$) from outer (switch 1) to inner (switch (L−1)). If a crowbar circuit is present when the expiration of the delay from delay circuit 1556 occurs, then a latch 1564 turns on a crowbar circuit 1570. Preferably crowbar circuit 1570 comprises Switch B in FIG. 14, so that when a switch between the most-negative bus level and the phase output is conducting the fault current, the negative portion of the phase output is shunted to a neutral voltage level.

The logic schematic in FIG. 16 is identical to FIG. 15, except that when the delay expires in either the positive half-circuit or the negative-half circuit, a latch 1764 turns on the crowbar circuit 1770 for both positive and negative phase-output portions. In this example, crowbar circuit 1770 preferably comprise both Switch A and Switch B from FIG. 14.

The logic schematic shown in FIG. 17 is a variation on FIGS. 15 and 16 in which instead of using desaturation signals from the driver cards, desaturation is determined based on whether a magnitude of I$_o$ exceeds a maximum rated short circuit current per transistor switch (I$_{sc}$). In this embodiment, when |I$_o$|>I$_{sc}$, the signal FLT3 is true, indicating desaturation. A counter 1752 decrements the value of M from outer-to-inner. Although not illustrated in FIG. 17, a duplicate circuit is used for the other half-branch (switches 1 to (L−1)), and the crowbar circuit can be driven, in the same fashion as presented in FIGS. 15 and 16. Additionally, the methods of determining desaturation based on I$_{SC}$ and the gate card desaturation signals may be combined for additional redundancy.

Figure 18A:
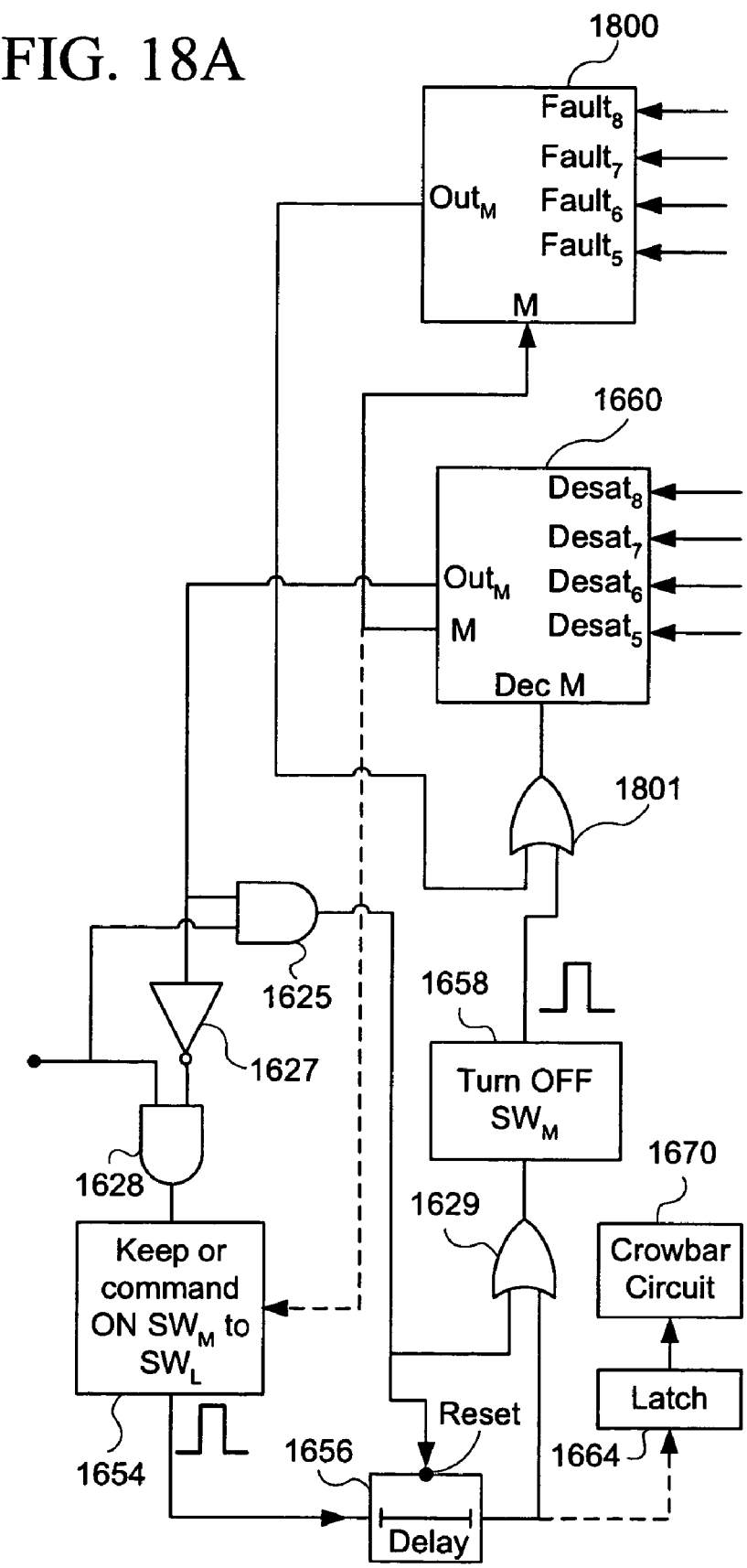
FIGS. 18A and 18B demonstrate how to integrate desaturation fault signals from the driver cards into the designs of FIGS. 15, 16, and 17.
Figure 18B:
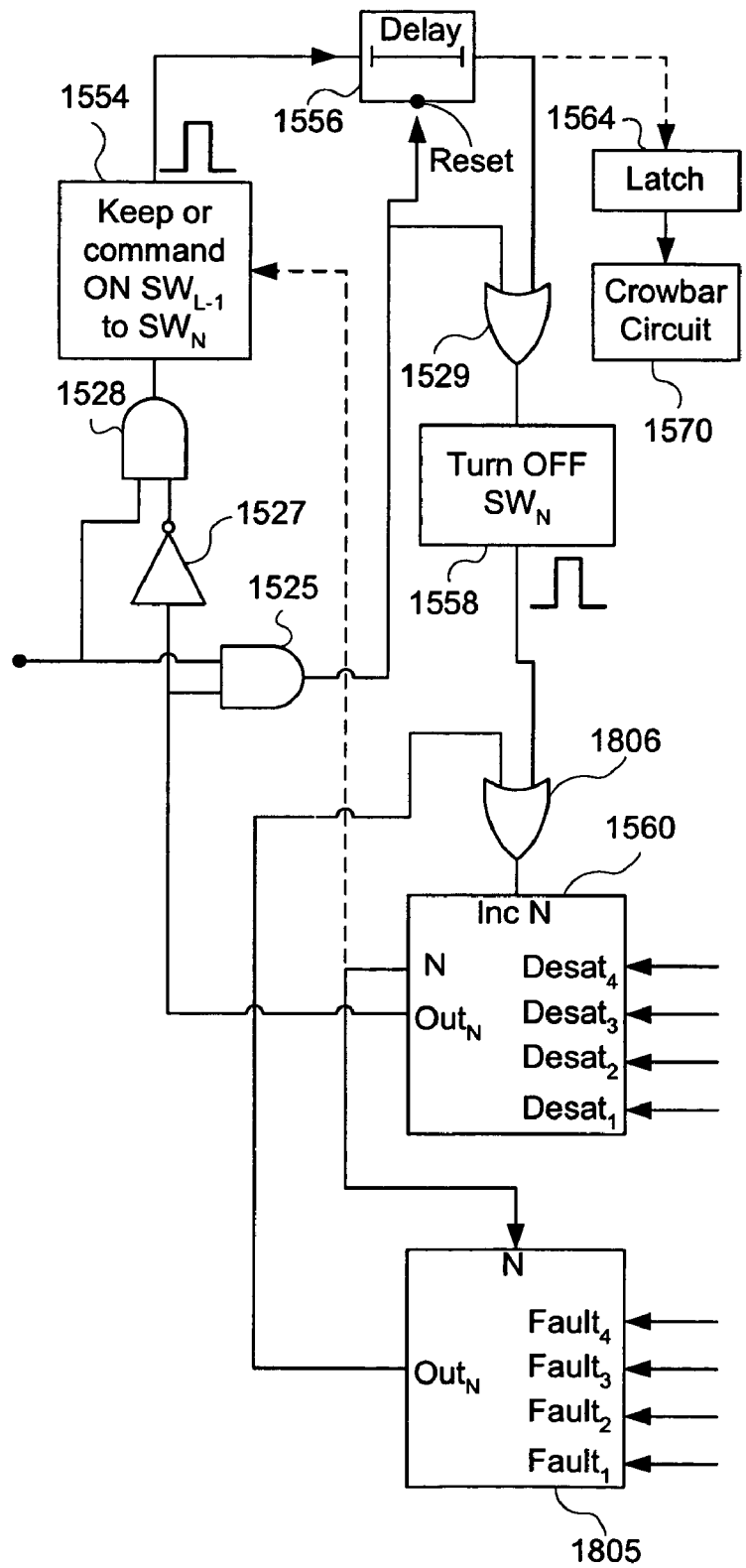

Further, as shown in FIGS. 18A and 18B, switch-fault handling can be integrated into the two circuits illustrated in FIGS. 15–17 for shutting down switches when both FLT1 and FLT2 are true. Switch-fault signals are utilized to determine when a switch has failed. An example of a switch-fault occurs when a switch is commanded to an off-state, but time t$_{off}$ transpires without the switch becoming non-conductive. The fault signals can be generated either by the driver cards, by the controller, or by a separate circuit. When multiplexers 1800 and 1805 receive a fault indication for the switch under consideration, the circuit advances to the next switch in the half-branch. If a two-level inverter bridge is utilized, the switch fault multiplexer (1800, 1805) can be omitted, using the fault signal to directly drive the OR gates (1801, 1806). Also, if switch-fault signaling is used with the circuit in FIG. 17, the desaturation signal multiplexers are preferably replaced with counters.

Figure 19:
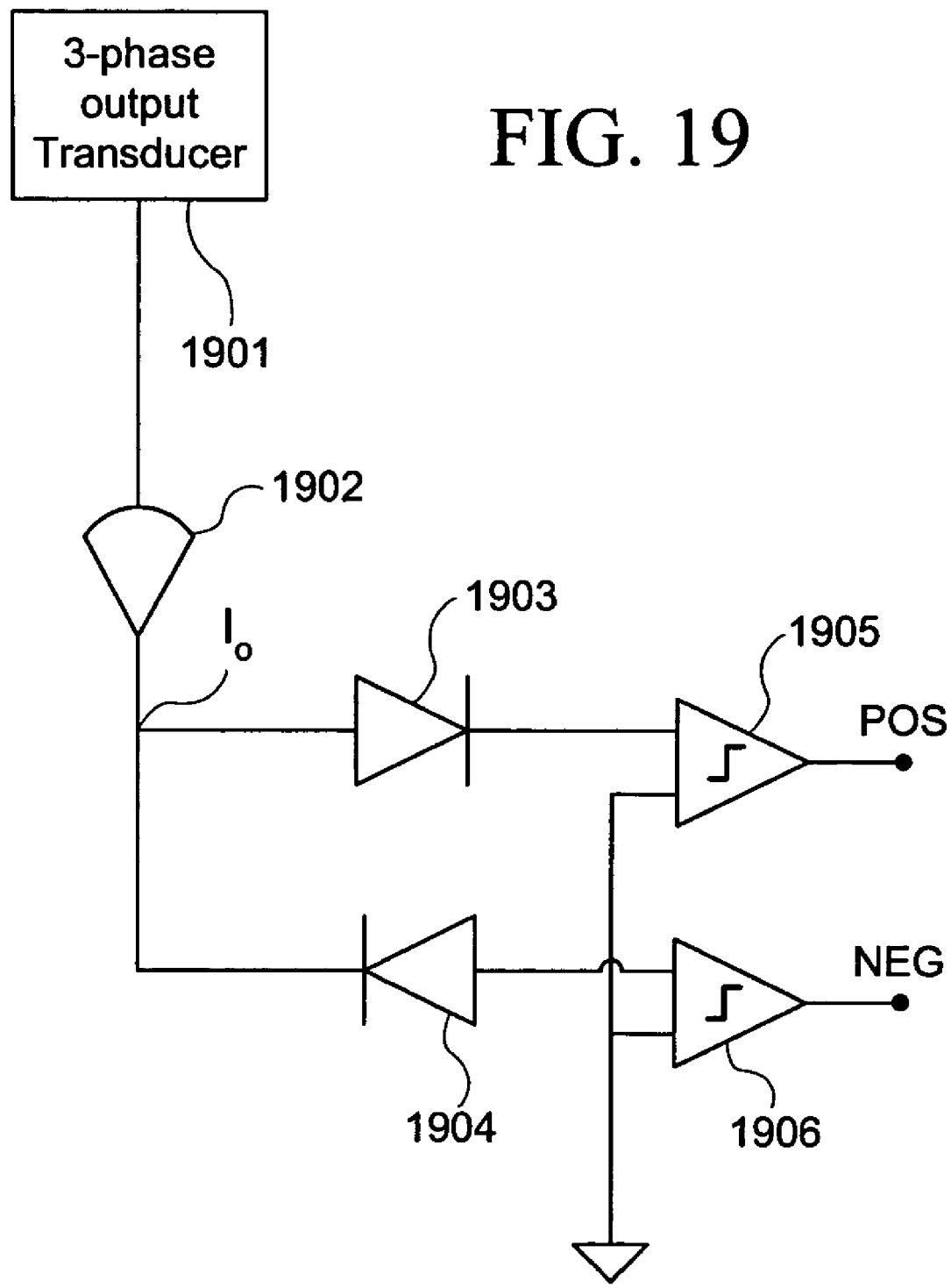
FIG. 19 is a logic diagram for determining the polarity of the instantaneous output current.

The elements in FIGS. 15, 16, 17, 18A, and 18B are intended as abstractions which may correspond to hardware, firmware, software, or a mix thereof. For example, the 3-phase output transducer (1501) and buffer circuit (1502) are illustrated as providing current-monitoring in absolute terms (|I$_o$|), whereas the output transducer may indicate current polarity provided (±I$_o$). If current polarity is provided by the transducer, either the monitored-current signal can be rectified to derive |I$_o$|, a separate comparison circuits may be provided for each polarity, or one circuit may handle both polarities. If polarity information is provided by the transducers, a determination of which half-branch is conducting the instantaneous by checking polarity. Exemplary logic for checking polarity is illustrated in FIG. 19, including transducer 1901, buffer circuit 1902, diodes 1903, 1904, and comparison circuits 1905, 1906.

Further, the output of the transducers 1501 and 1901 are a signal indicative of output current, but is not necessarily itself a current (e.g., voltage or frequency). Buffer circuits 1502 and 1902 might be implemented as a current follower(s), an amplifier circuit(s), an analog-to-digital converter(s), or other circuit for converting the signal output by the transducer into a format that can be compared to threshold levels. Likewise, the current sources 1503, 1504, 1505 may be actual current sources, or might be equivalent reference voltages (if the comparison circuits compare voltage instead of current), might be digital values representing current levels, or other representations corresponding to the various thresholds. The reference levels 1503, 1504, 1505, as well as the compared value I$_o$ are all relative levels, and are scaled to represent particular output conditions, and need not correspond one-to-one to the actual output current. Comparison circuits 1510, 1511, 1512, 1905, and 1906 might be digital comparison circuits, comparing input digital signals; or might be voltage comparators having resistances at their inputs to convert currents to voltages; current comparators; or machine instructions comparing digital values stored in memory or registers; or any other type of circuit that can make the comparison between the threshold levels and the instantaneous signal. The delay circuits 1556 and 1656, may either have preset values (e.g., FIG. 8A), or be feedback-based (e.g., FIG. 8B). Likewise the various gates shown are intended to illustrate logical functions, which might be actual gates, instructions, or logic equivalents.

A further embodiment of the invention is the crowbar circuit itself, as exemplified in FIG. 14. This additional rectifier circuit at the output of the inverter bridge is able to artificially create a low impedance fault on the drive. When a Type II fault is detected by the controller, Switches A and B provided across the inverter bridge output are switched-on to provide a dead short. This sudden drop in impedance will cause the IGBT to go immediately out of saturation. If the short is provided for only a small time period (e.g., 20 μs), there is little or no heat transfer or damage to Switches A and B creating the artificial short.

Switches A and B should be rated to have an equal or greater current capacity relative to the switches of the inverter bridge. Whereas the switches of the inverter bridge according to above embodiments are of types experiencing saturation (e.g., BJTs, IGBTs, and FETs), the Switches A and B of the crowbar circuit can be any type of switch, including BJTs, IGBTs, FETs, Insulated Gate Controlled Thryristors (IGCTs), Gate-Turn-Off (GTO) thryristors, silicon-controlled switches, transistors, switching diodes, and thyristors.

Figure 1:
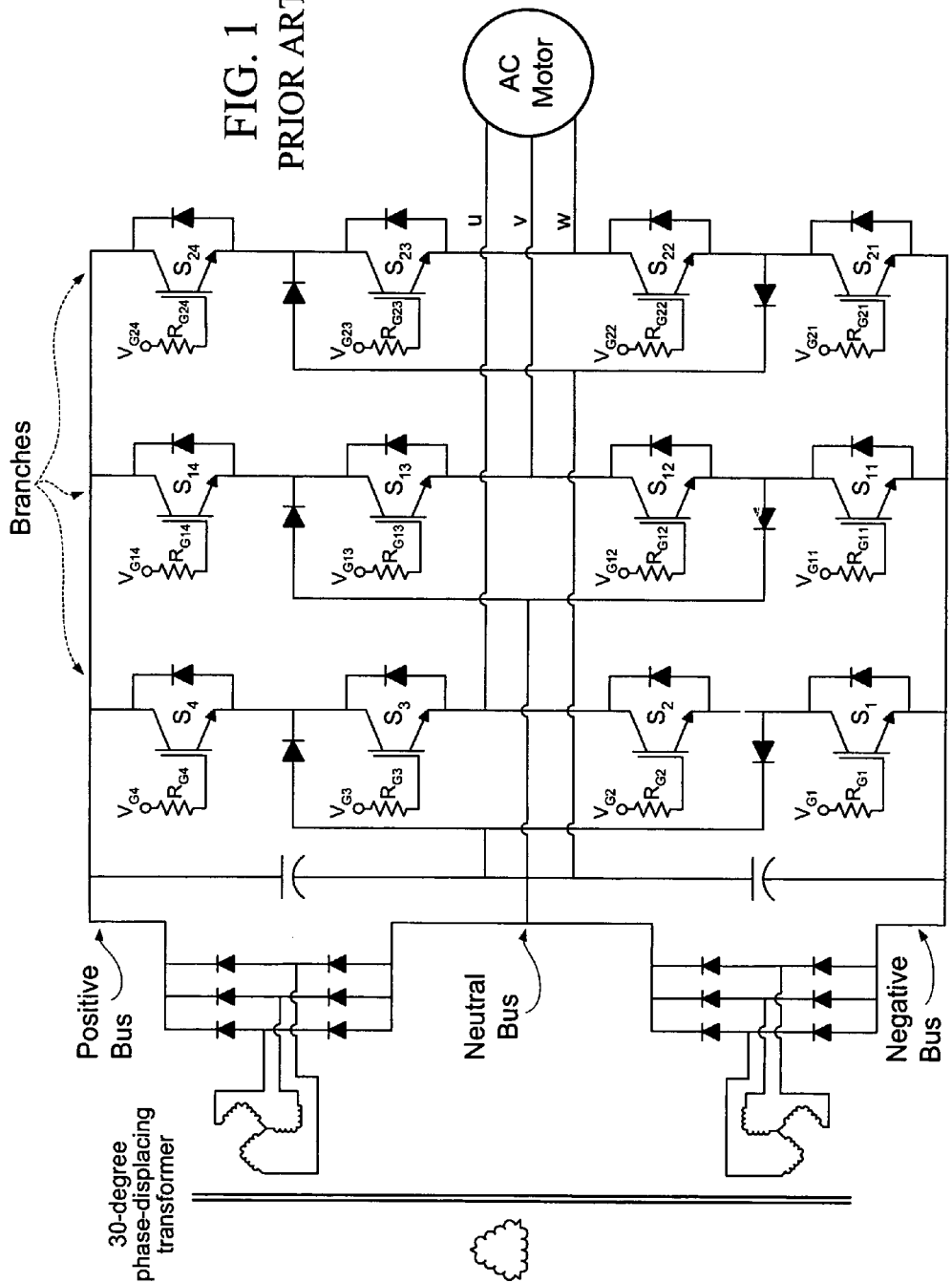
FIG. 1 illustrates an exemplary three-level inverter bridge circuit having an AC motor as the inductive load.
Figure 2:
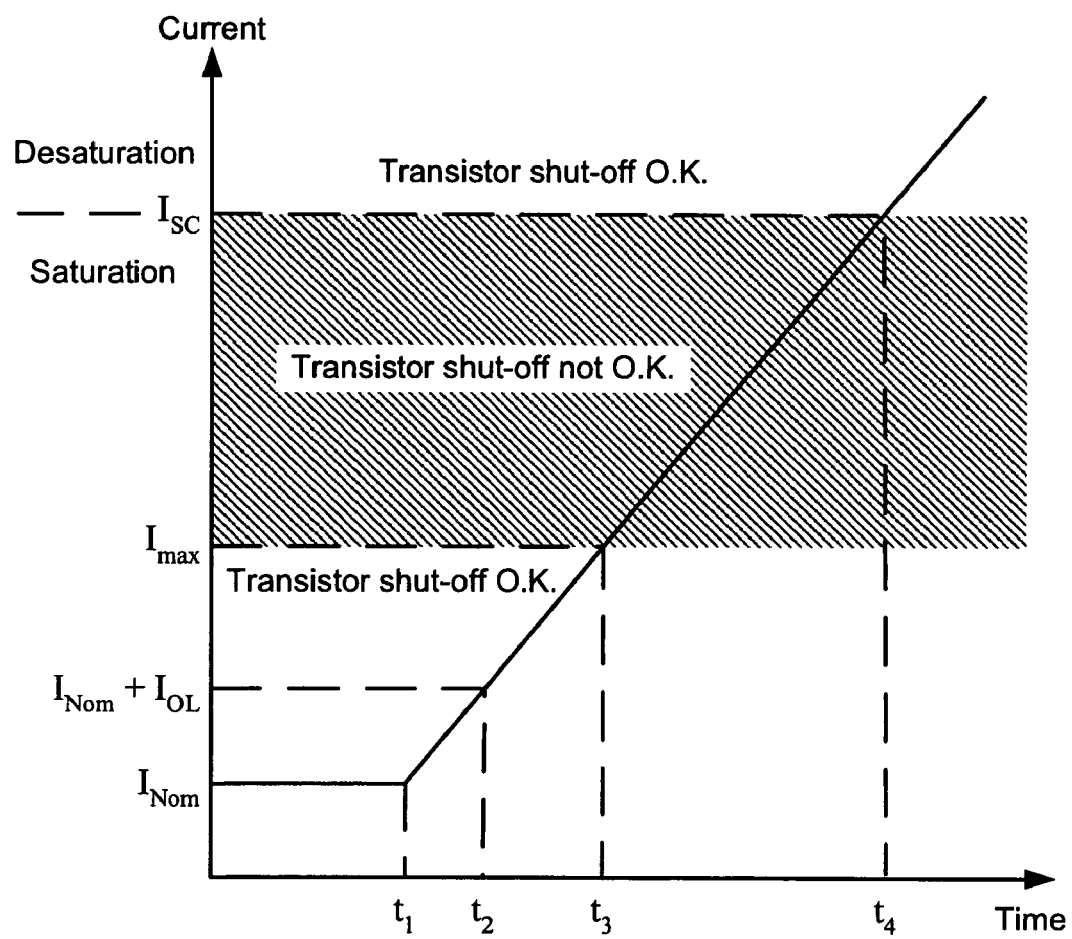
FIG. 2 is a current-time graph illustrating a change in current over time during a Type II fault.
Figure 3:
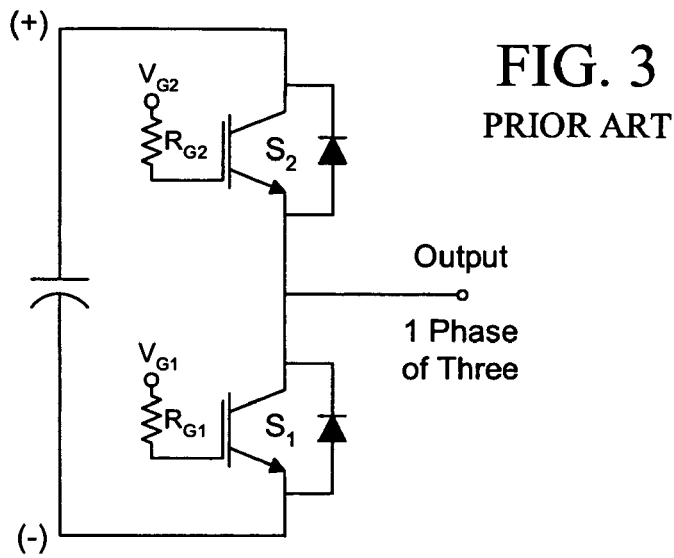
FIG. 3 illustrates a single branch of a two-level inverter bridge.
Figure 4:
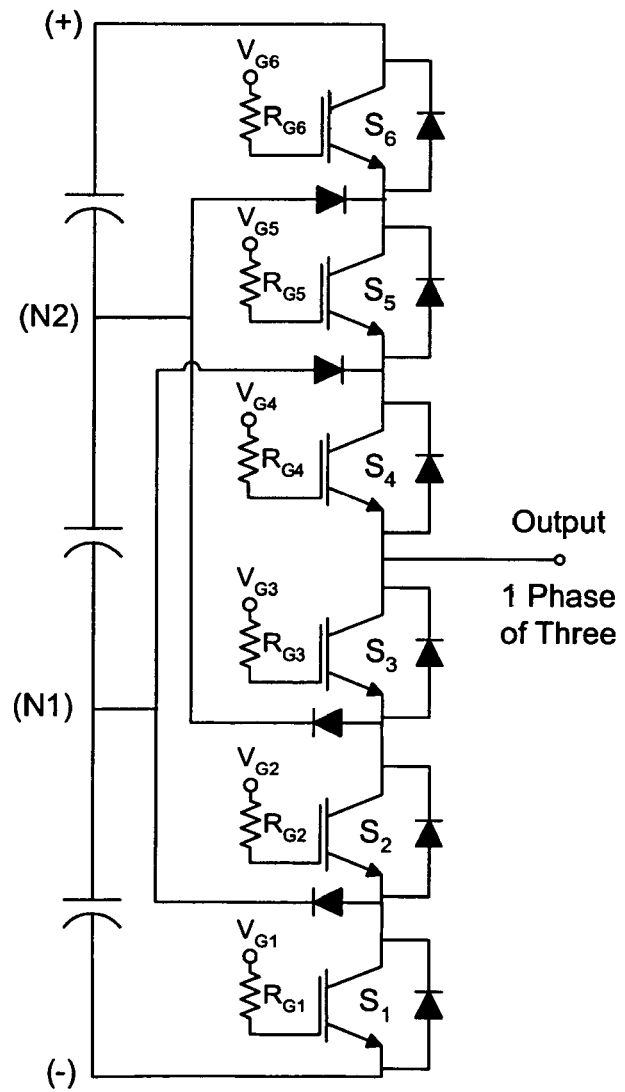
FIG. 4 illustrates a single branch of a four-level inverter bridge.
Figure 20:
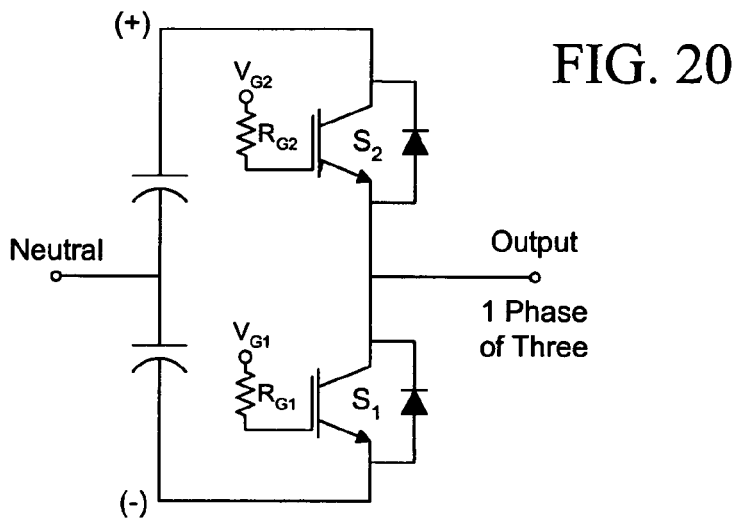
FIG. 20 is a two-level inverter bridge branch providing a neutral voltage level for use with the crowbar protection circuit of the present invention.
Figure 21:
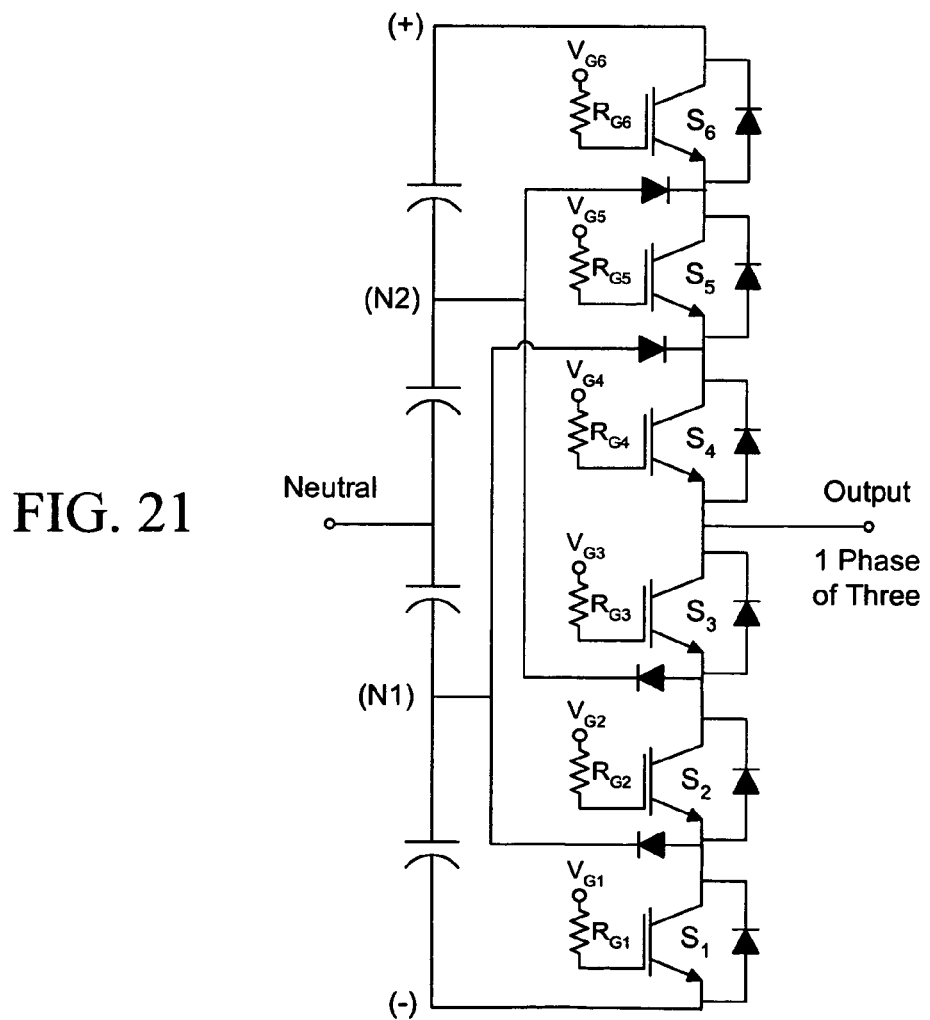
FIG. 21 is a four-level inverter bridge branch providing a neutral voltage level for use with the crowbar protection circuit of the present invention.

Although inverter bridges having an odd-number of bus voltage levels include a neutral level ("Neutral Bus" in FIG. 14, "N2" in FIG. 5), such a level is missing from conventional inverter bridges having an even-number of bus levels (FIGS. 3 and 5). Accordingly, FIGS. 20 and 21 illustrate two-level and four-level inverter bridge branches in which the neutral level is artificially derived. Such an arrangement will also work six-level and higher bridges. The neutral level for both even (FIGS. 20 and 21) and odd (FIGS. 5 and 14) inverter bridges may or may not be grounded.

It is contemplated that numerous modifications may be made to the embodiments and implementations of the present invention without departing from the spirit and scope of the invention as defined in the following claims.

What is claimed is:

1. A method of controlling a three-phase inverter bridge having three branches, each branch providing one phase of a three-phase output for driving an inductive load, the inverter bridge having "L" bus voltage levels (L≧2),
   wherein one of the L levels is a most-negative bus voltage and one of the L levels is a most-positive bus voltage, each branch comprising two half-branches, a first one-half branch comprising transistor switches connected between the most-positive bus voltage and a respective phase output, and a second one-half branch comprising transistor switches connected between the most-negative bus voltage and the respective phase output,
   wherein within a half-branch, outer is defined as toward the most-positive or most-negative bus voltage, and inner is defined as toward the phase output,
   wherein for each branch, the method comprises:
   comparing a magnitude of an instantaneous output current ($I_o$) of a phase of the three-phase output of the inverter bridge with a rated nominal current of a transistor switch ($I_{Nom}$) of the transistor switches of the branch plus an overload current threshold ($I_{OL}$), wherein $I_{OL}+I_{Nom}$ satisfies $I_{max}>I_{OL}+I_{NOM}\geq I_{Nom}$, $I_{max}$ being a maximum rated current of the transistor switches of the branch;
   in response to comparing $I_o$ with $I_{Nom}+I_{OL}$, if $|I_o|>I_{Nom}+I_{OL}$, then for each one-half branch of said branch:
      identifying transistor switches of the half branch that are conducting the instantaneous output current ($I_o$) exceeding $I_{Nom}+I_{OL}$;
      securing an off-state to transistor switches of the half branch that are identified as being in an off-state;
      sequentially turning off transistor switches in the half branch that are not conducting the instantaneous output current ($I_o$) exceeding $I_{Nom}+I_{OL}$;
   comparing the instantaneous output current ($I_o$) exceeding $I_{Nom}+I_{OL}$ with $I_{max}$, and if $|I_o|\leq I_{max}$,
      sequentially commanding all transistor switches of the half-branch remaining in an on-state to assume an off-state, while continuing to compare for $|I_o|>I_{max}$; and
      until a time elapsed after said step of sequentially commanding exceeds $t_{off}$, continuing to compare for $|I_o|>I_{max}$, wherein $t_{off}$ is defined as a rated turn-off time of the transistor switches which is a sum of a turn-off delay time plus current fall-time,
   and if $|I_o|>I_{max}$,
      checking a most outer transistor switch remaining in an on-state for desaturation,
      and if not desaturated,
         keeping the most outer transistor switch remaining in an on-state and any transistor switches between the most outer transistor switch and the phase output in an on-state, and if the most outer transistor switch and any transistor switches between the most outer transistor switch and the phase output have been commanded to an off-state, then commanding these transistor switches back to an on-state, and then
         delaying until a sooner of desaturation of the most outer transistor switch remaining in an on-state, expiration of a delay period based upon an amount of time before the most outer transistor remaining in an on-state is damaged, and $|I_o|<I_{max}$;
      and if the most outer transistor switch is desaturated, when said delay period expires, or $|I_o|<I_{max}$,
         turning off the most outer transistor switch remaining in an on-state, and then
         if any transistor switches of the half-branch remain in an on-state, repeating the method from said step of comparing the instantaneous output current ($I_o$) exceeding $I_{Nom}+I_{OL}$ with $I_{max}$.

2. A method according to claim 1, said step of checking a most outer transistor switch remaining in an on-state for desaturation comprises determining whether a voltage across the transistor switch is above a rated saturation voltage of the transistor switch.

3. A method according to claim 1, wherein said delay period corresponds to a time for a temperature of the most outer transistor switch remaining in an on-state to reach a maximum rated temperature value.

4. A method according to claim 1, wherein said transistor switches are insulated gate bipolar transistors (IGBTs) or bipolar junction transistors (BJTs), and
   said step of checking a most outer transistor switch remaining in an on-state for desaturation comprises determining whether the collector-to-emitter voltage ($V_{ce}$) of the transistor switch is above a rated saturation collector-to-emitter voltage ($V_{ce\ sat}$) of the transistor switch, the transistor switch being not desaturated if $V_{ce}\leq V_{ce\ sat}$ and being desaturated if $V_{ce}>V_{ce\ sat}$.

5. A method according to claim 4, wherein said delay period corresponds to a time for a temperature of the most outer transistor switch remaining in an on-state to reach a maximum rated temperature value, and is determined by:

$$\int (V_{ce \cdot sat} \times |I_o|) dt > \frac{V_{ce \cdot max} \times I_{sc}}{L-1}$$

wherein:
$V_{ce\ max}$ is defined as a maximum rated collector-to-emitter voltage across a transistor switch remaining in an on-state, and
$I_{sc}$ is defined as a maximum rated short circuit current per transistor switch.

6. A method according to claim 4, wherein said delay period corresponds to a time for a temperature of the most outer transistor switch remaining in an on-state to reach a maximum rated temperature value, and approximately equals:

$$\frac{t_{sc \cdot max} \times V_{ce \cdot sat}}{V_{ce \cdot max}}$$

wherein:
$V_{ce\ max}$ is defined as a maximum rated collector-to-emitter voltage across the transistor switch remaining in an on-state, and
$t_{sc\ max}$ is defined as a rated maximum short-circuit time duration which the transistor switch can withstand when submitted to $V_{ce\ max}$ and $I_{sc}$.

7. A method according to claim 1, wherein the method further comprises:
when said delay period expires without the most outer transistor remaining in an on-state desaturating, prior to turning off the most outer transistor,
shunting the phase output provided by the half-branch to a neutral level if not already shunted to a neutral voltage level,
wherein the neutral voltage level is a difference of the most-positive bus voltage and the most-negative bus voltage, divided by two.

8. A method according to claim 7, wherein:
when the half-branch is a first one-half branch, said step of shunting the phase output to the neutral level shunts first one-half branches of all three branches of the three-phase inverter bridge, and
when the half branch is a second one-half branch, said step of shunting the phase output to the neutral level shunts second one-half branches of all three branches of the three-phase inverter bridge.

9. A method according to claim 7, wherein said step of shunting the phase output to the neutral level shunts all half-branches of all three branches of the three-phase inverter bridge.

10. A storage medium storing a set of program instructions for a controller, the controller being configured to control a three-phase inverter bridge having three branches, each branch providing one phase of a three-phase output for driving an inductive load, the inverter bridge having "L" bus voltage levels (L≧2),
wherein one of the L levels is a most-negative bus voltage and one of the L levels is a most-positive bus voltage, each branch comprising two half-branches, a first one-half branch comprising transistor switches connected between the most-positive bus voltage and a respective phase output, and a second one-half branch comprising transistor switches connected between the most-negative bus voltage and the respective phase output,
wherein within a half-branch, outer is defined as toward the most-positive or most-negative bus voltage, and inner is defined as toward the phase output,
the set of program instructions, when executed by the controller, causing the controller to perform the following steps for each branch the three-phase inverter bridge:
comparing a magnitude of an instantaneous output current ($I_o$) of a phase of the three-phase output of the inverter bridge with a rated nominal current of a transistor switch ($I_{Nom}$) of the transistor switches of the branch plus an overload current threshold ($I_{OL}$), wherein $I_{OL}$+$I_{Nom}$ satisfies $I_{max}>I_{OL}+I_{NOM}\geq I_{Nom}$, $I_{max}$ being a maximum rated current of the transistor switches of the branch;
in response to comparing $I_o$ with $I_{Nom}+I_{OL}$, if $|I_o|>I_{Nom}+I_{OL}$, then for each one-half branch of said branch:
identifying transistor switches of the half branch that are conducting the instantaneous output current ($I_o$) exceeding $I_{Nom}+I_{OL}$;
securing an off-state to transistor switches of the half branch that are identified as being in an off-state;
sequentially turning off transistor switches in the half branch that are not conducting the instantaneous output current ($I_o$) exceeding $I_{Nom}+I_{OL}$;
comparing the instantaneous output current ($I_o$) exceeding $I_{Nom}+I_{OL}$ with $I_{max}$, and if $|I_o|\leq I_{max}$,
sequentially commanding all transistor switches of the half-branch remaining in an on-state to assume an off-state, while continuing to compare for $|I_o|>I_{max}$; and
until a time elapsed after said step of sequentially commanding exceeds $t_{off}$, continuing to compare for $|I_o|>I_{max}$, wherein $t_{off}$ is defined as a rated turn-off time of the transistor switches which is a sum of a turn-off delay time plus current fall-time,
and if $|I_o|>I_{max}$,
checking a most outer transistor switch remaining in an on-state for desaturation,
and if not desaturated,
keeping the most outer transistor switch remaining in an on-state and any transistor switches between the most outer transistor switch and the phase output in an on-state, and if the most outer transistor switch and any transistor switches between the most outer transistor switch and the phase output have been commanded to an off-state, then commanding these transistor switches back to an on-state, and then
delaying until a sooner of desaturation of the most outer transistor switch remaining in an on-state, expiration of a delay period based upon an amount of time before the most outer transistor remaining in an on-state is damaged, and $|I_o|<I_{max}$;
and if the most outer transistor switch is desaturated, when said delay period expires, or $|I_o|<I_{max}$,
turning off the most outer transistor switch remaining in an on-state, and then
if any transistor switches of the half-branch remain in an on-state, repeating from the step of comparing the instantaneous output current ($I_o$) exceeding $I_{Nom}+I_{OL}$ with $I_{max}$.

11. A storage medium storing a set of program instructions for a controller according to claim 10, wherein said delay period corresponds to a time for a temperature of the most outer transistor switch remaining in an on-state to reach a maximum rated temperature value.

12. A storage medium storing a set of program instructions for a controller according to claim 10, the set of program instructions, when executed by the controller, further causing the controller to perform the following step:
when said delay period expires without the most outer transistor remaining in an on-state desaturating, prior to turning off the most outer transistor,
shunting the phase output provided by the half-branch to a neutral level if not already shunted to a neutral voltage level,
wherein the neutral voltage level is a difference of the most-positive bus voltage and the most-negative bus voltage, divided by two.

13. A three-phase inverter controller for controlling a three-phase inverter bridge having three branches, each branch providing one phase of a three-phase output for driving an inductive load, the inverter bridge having "L" bus voltage levels (L≧2),
wherein one of the L levels is a most-negative bus voltage and one of the L levels is a most-positive bus voltage, each branch comprising two half-branches, a first one-half branch comprising transistor switches connected between the most-positive bus voltage and a respective phase output, and a second one-half branch comprising transistor switches connected between the most-negative bus voltage and the respective phase output,
wherein within a half-branch, outer is defined as toward the most-positive or most-negative bus voltage, and inner is defined as toward the phase output,
for each branch, the controller comprising at least a first comparison circuit, a second comparison circuit, a delay circuit, and logic circuitry,
the first comparison circuit comparing a magnitude of an instantaneous output current ($I_o$) of a phase of the three-phase output of the inverter bridge with a rated nominal current ($I_{Nom}$) of the transistor switches of the branch plus an overload current threshold ($I_{OL}$), wherein $I_{OL}+I_{NOM}$ satisfies $I_{max}>I_{OL}+I_{Nom}≧I_{Nom}$, $I_{max}$ being a maximum rated current of the transistor switches of the branch,
wherein, if $|I_o|>I_{Nom}+I_{OL}$, then the logic circuitry:
identifies transistor switches of the branch that are conducting the instantaneous output current ($I_o$) exceeding $I_{Nom}+I_{OL}$;
secures an off-state to transistor switches that are identified as being in an off-state;
sequentially, from outer-to-inner, commands off transistor switches within a half-branch containing transistor switches that have an on-state but are not conducting the instantaneous output current ($I_o$) exceeding $I_{Nom}+I_{OL}$;
the second comparison circuit comparing the instantaneous output current ($I_o$) with $I_{max}$,
wherein while $|I_o|>I_{Nom}+I_{OL}$ and $|I_o|≦I_{max}$, the logic circuitry:
sequentially, from outer-to-inner, commands all transistor switches remaining in an on-state to assume an off-state;
and wherein while $|I_o|>I_{max}$, the logic circuitry:
determines whether a most outer transistor switch remaining in an on-state is desaturated, and
if the outer transistor switch remaining in an on-state is desaturated, then the logic circuitry:
keeps the most outer transistor switch remaining in an on-state and any transistor switches between the most outer transistor switch and the phase output in an on-state, and if the most outer transistor switch and any transistor switches between the most outer transistor switch and the phase output have been commanded to an off-state, then commanding these transistor switches back to an on-state, and then
waits until a sooner of desaturation of the most outer transistor switch remaining in an on-state, expiration of a delay period of the delay circuit, the delay period being based upon an amount of time before the most outer transistor remaining in an on-state is damaged, and $|I_o|<I_{max}$;
and if most outer transistor switch remaining in an on-state is desaturated, when said delay period expires, or $|I_o|<I_{max}$, then the logic circuitry:
turns off the most outer transistor switch remaining in an on-state, after which, a next most outer transistor switch, if any, remaining in an on-state is checked for desaturation.

14. A three-phase-level inverter controller according to claim 13, wherein the logic circuitry checks whether a most outer transistor switch remaining in an on-state is desaturated by checking a signal received from a driver card driving the most outer transistor switch.

15. A three-phase-level inverter controller according to claim 13, wherein the delay period of the delay circuit is set so that expiration of the delay period corresponds to a time for a temperature of the most outer transistor switch remaining in an on-state to reach a maximum rated temperature value.

16. A three-phase-level inverter controller according to claim 13, wherein the first comparison circuit comprises a first comparator, and the second comparison circuit comprises a second comparator.

17. A crowbar circuit for protecting transistor switches of a three-phase inverter bridge when a short occurs and at least one of the transistor switches is allowed to saturate due to a short-circuit inductance, the three-phase inverter bridge having three branches, each branch providing one phase of a three-phase output for driving an inductive load, the inverter bridge having "L" bus voltage levels (L≧2), wherein one of the L levels is a most-negative bus voltage and one of the L levels is a most-positive bus voltage, any intermediate bus voltage levels if (L>2) being differentiated from other bus voltage levels by a difference of the most-positive bus voltage and the most-negative bus voltage, divided by (L−1), the crowbar circuit comprising:
at least one switch, selectively shunting each phase of the three-phase output of the inverter bridge to a neutral voltage level, the neutral voltage level being a difference of the most-positive bus voltage and the most-negative bus voltage, divided by two,
wherein, by closing said at least one switch, selectively shunting each phase to the neutral voltage, saturated transistor switches of the three-phase inverter bridge become desaturated.

18. A crowbar circuit according to claim 17,
wherein if "L" is an odd number, the neutral voltage level is one of the "L" bus voltage levels of the inverter bridge, and
wherein if "L" is an even number, the neutral voltage level is between two of the "L" bus voltage levels of the inverter bridge.

19. A crowbar circuit according to claim 17, wherein the crowbar circuit is provided within a separate housing from the three-phase inverter bridge, configured to be electrically connected to the three-phase output of the inverter bridge.

20. A crowbar circuit according to claim 17, wherein said at least one switch comprises a first switch and a second switch, the crowbar circuit further comprising:
a first set of three diodes, each diode of the first set having an anode connected to a respective phase output of the three-phase output of the inverter bridge, cathodes of the first set of three diodes being connected to said first switch, said first switch selectively shunting a first half-wave rectified portion of the three-phase output to the neutral voltage level, and
a second set of three diodes, each diode of the second set having a cathode connected to a respective phase output of the three-phase output of the inverter bridge, anodes of the second set of three diodes being connected to said second switch, said second switch selectively shunting a second half-wave rectified portion of the three-phase output to the neutral voltage level.

21. A crowbar circuit according to claim 20, wherein the first and second switch are configured to be closed collectively.

22. A crowbar circuit according to claim 20, wherein the first and second switch are configured to be closed individually.

23. A method of protecting transistor switches of a three-phase inverter bridge when a short occurs and at least one of the transistor switches is allowed to saturate due to a short-circuit inductance, the three-phase inverter bridge having three branches, each branch providing one phase of a three-phase output for driving an inductive load, the inverter bridge having "L" bus voltage levels ($L \geq 2$), wherein one of the L levels is a most-negative bus voltage and one of the L levels is a most-positive bus voltage, the method comprising:
detecting a short-circuit by comparing output currents of each phase of the three-phase output of the inverter bridge with a threshold level;

in each branch providing one of the three-phase outputs in which a short-circuit is detected, determining whether each transistor switch of the branch having an on-state is saturated, and if it is determined that at least one transistor switch is saturated, shunting the phase corresponding to the branch to a neutral voltage level, the neutral voltage level being a difference of the most-positive bus voltage and the most-negative bus voltage, divided by two.

24. A method according to claim 23, wherein each branch of the inverter bridge comprises two half-branches, a first one-half branch comprising transistor switches connected between the most-positive bus voltage and the phase output, and a second one-half branch comprising transistor switches connected between the most-negative bus voltage and the phase output, said method further comprising:

wherein when a saturated transistor switch is in one of the first one-half branches of the inverter bridge, said step of shunting comprises:
shunting that portion of the phase output having a more-positive bus voltage level than the neutral voltage level to the neutral voltage level; and wherein when a saturated transistor switch is in one of the second one-half branches of the inverter bridge, said step of shunting comprises:
shunting that portion of the phase output having a more-negative voltage level than the neutral voltage level to the neutral voltage level.

25. A method according to claim 23, wherein said shunting comprises:

shunting that portion of the phase output having a more-positive bus voltage level than the neutral voltage level to the neutral voltage level; and shunting that portion of the phase output having a more-negative voltage level than the neutral voltage level to the neutral voltage level.

* * * * *